United States Patent [19]

Eng et al.

[11] 3,976,448

[45] Aug. 24, 1976

[54] ELECTROSTATIC AND SONIC GAS PROCESSING APPARATUS

[75] Inventors: Joseph W. Eng, Bayside, N.Y.; Stanley C. F. Lin, Matawan, N.J.

[73] Assignee: Lin Eng Corporation, New York, N.Y.

[22] Filed: Mar. 24, 1975

[21] Appl. No.: 561,556

Related U.S. Application Data

[63] Continuation of Ser. No. 245,756, April 20, 1972, which is a continuation of Ser. No. 732,140, May 27, 1968, abandoned, and a continuation-in-part of Ser. No. 664,416, Aug. 30, 1967, Pat. No. 3,494,099.

[52] U.S. Cl. ................................. 55/122; 21/74 R; 55/15; 55/DIG. 30; 55/123; 55/127; 55/139; 55/151; 55/154; 55/276; 55/277; 55/279; 55/238; 55/385 B; 55/387; 55/456; 60/275; 123/119 B

[51] Int. Cl.² ........................................ B01D 50/00

[58] Field of Search ............. 55/122, 123, 139, 151, 55/127, 154, 15, 277, 238, 276, 279, 238, 385, 387, 456, DIG. 30; 60/275; 123/119

[56] References Cited

UNITED STATES PATENTS

| | | | |
|---|---|---|---|
| 1,200,887 | 10/1916 | Schmidt | 55/151 |
| 1,843,839 | 2/1932 | Ruder | 55/127 |
| 1,846,365 | 2/1932 | Seipp | 55/127 |
| 1,883,372 | 10/1932 | Hedberg | 55/5 |
| 2,440,455 | 4/1948 | White | 55/123 |
| 2,711,226 | 6/1955 | Davis, Jr. | 55/127 |
| 2,970,670 | 2/1961 | Nodolf | 55/138 |
| 3,157,479 | 11/1964 | Boles | 55/152 |
| 3,406,669 | 10/1968 | Edwards | 123/119 B |

FOREIGN PATENTS OR APPLICATIONS

| | | | |
|---|---|---|---|
| 694,603 | 9/1930 | France | 55/150 |
| 858,692 | 12/1952 | Germany | 55/127 |
| 464,858 | 12/1928 | Germany | 55/130 |
| 301,930 | 11/1929 | United Kingdom | 55/100 |

OTHER PUBLICATIONS

White, Harry J. Industrial Precipitation, Addison–Wesley Publishing Co., Inc., Reading, Mass. copyright 1963, p. 6.

Primary Examiner—Bernard Nozick
Attorney, Agent, or Firm—Morgan, Finnegan, Pine, Foley & Lee

[57] ABSTRACT

A gas processing apparatus for causing physical and chemical changes in a gaseous material. The apparatus can be used for removing particulate materials from gases, selectively sorbing portions of gases, causing gases to chemically react with each other, and for removing odors and killing bacteria. By this apparatus high electrostatic and intensive sonic forces are simultaneously imparted to gaseous materials while the flow of such gases is controlled, i.e. by baffling. The sonic forces, moreover, are preferably imparted by a novel, flexible vibratable series of conductive ribbons connected to alternate current voltage source. For odor removal and germicide action negative ions and ultraviolet rays can also be employed.

10 Claims, 45 Drawing Figures

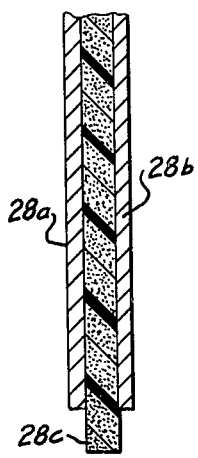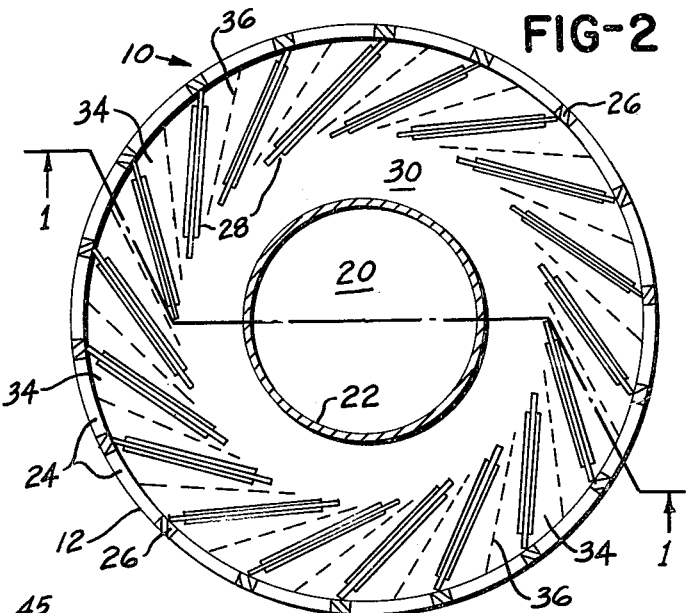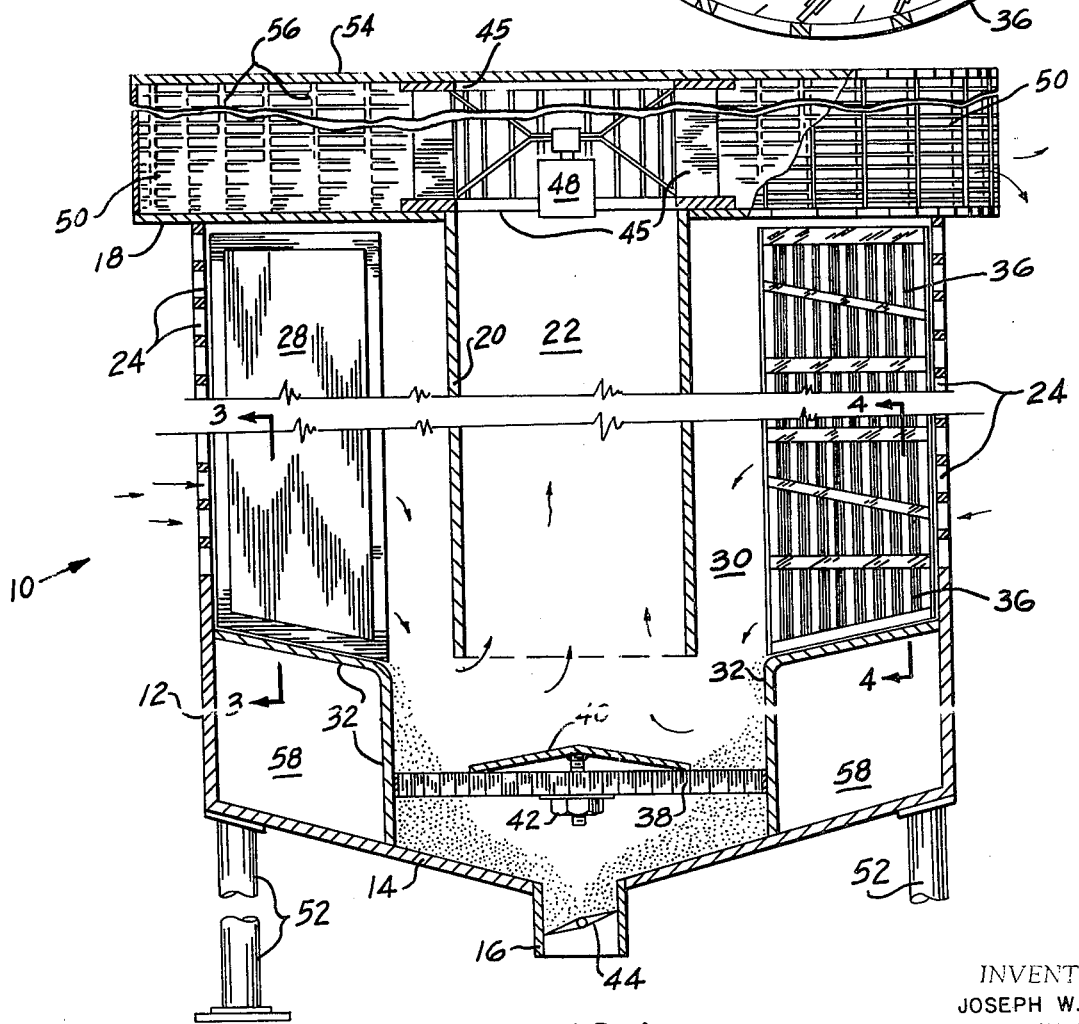

INVENTORS
JOSEPH W. ENG
STANLEY C. F. LIN
BY
MORGAN, FINNEGAN, DURHAM & PINE
ATTORNEYS

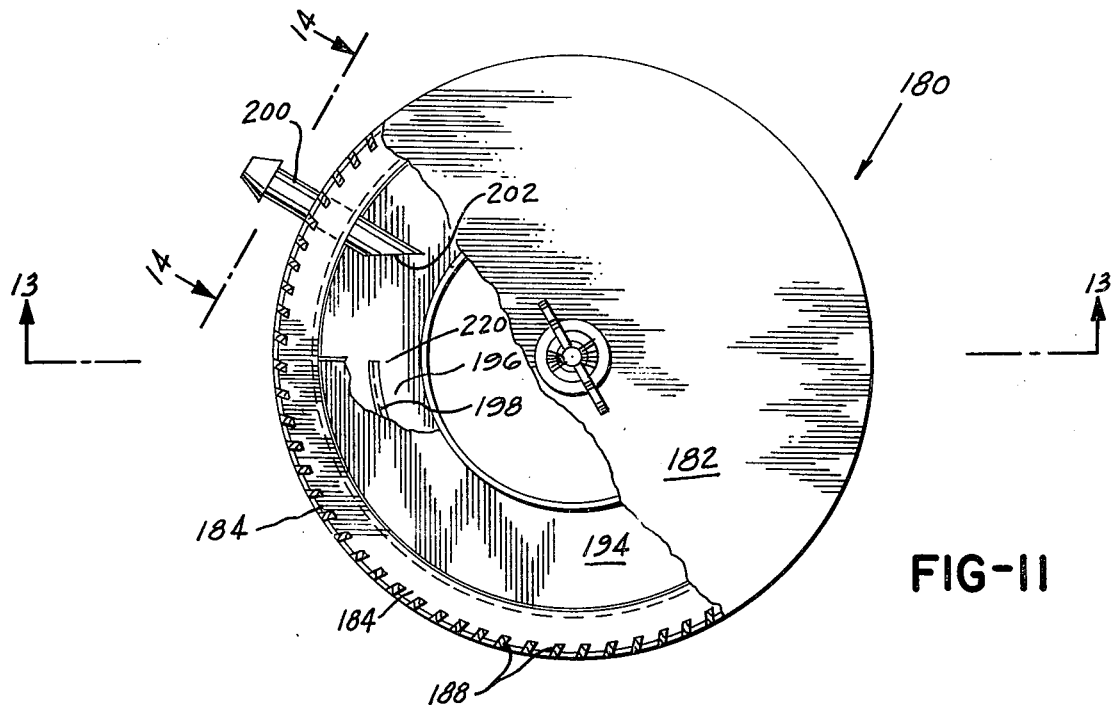
FIG-11
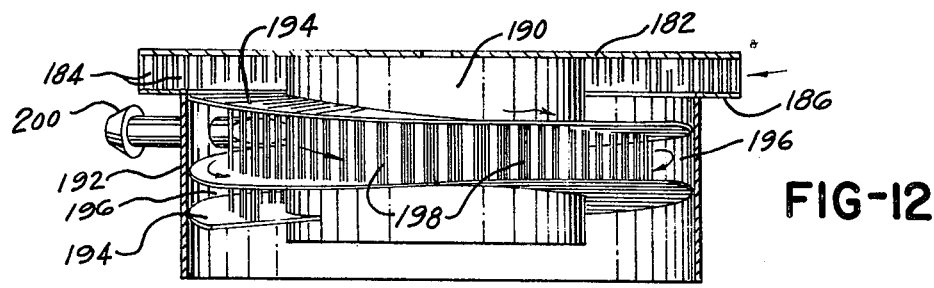
FIG-12
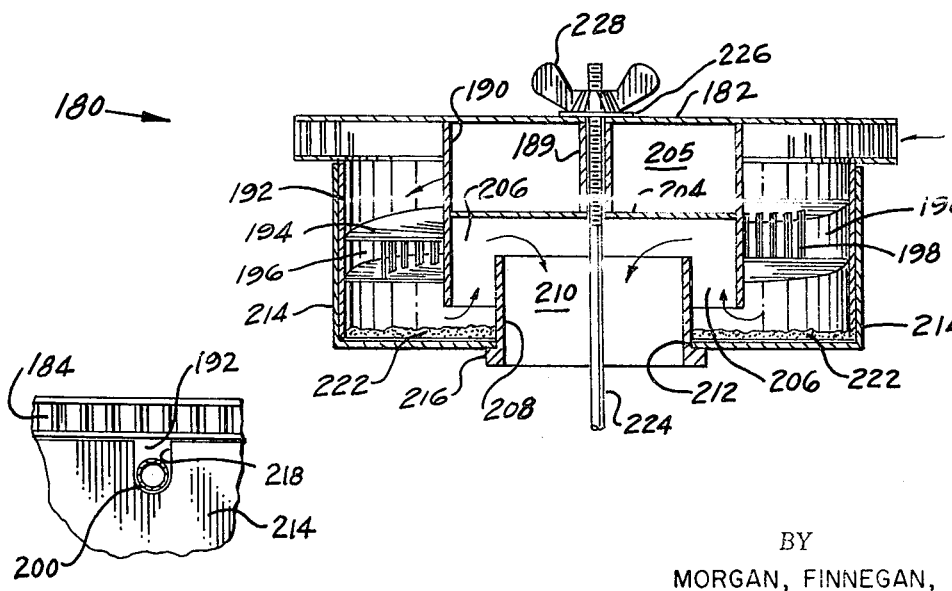
FIG-13
FIG-14

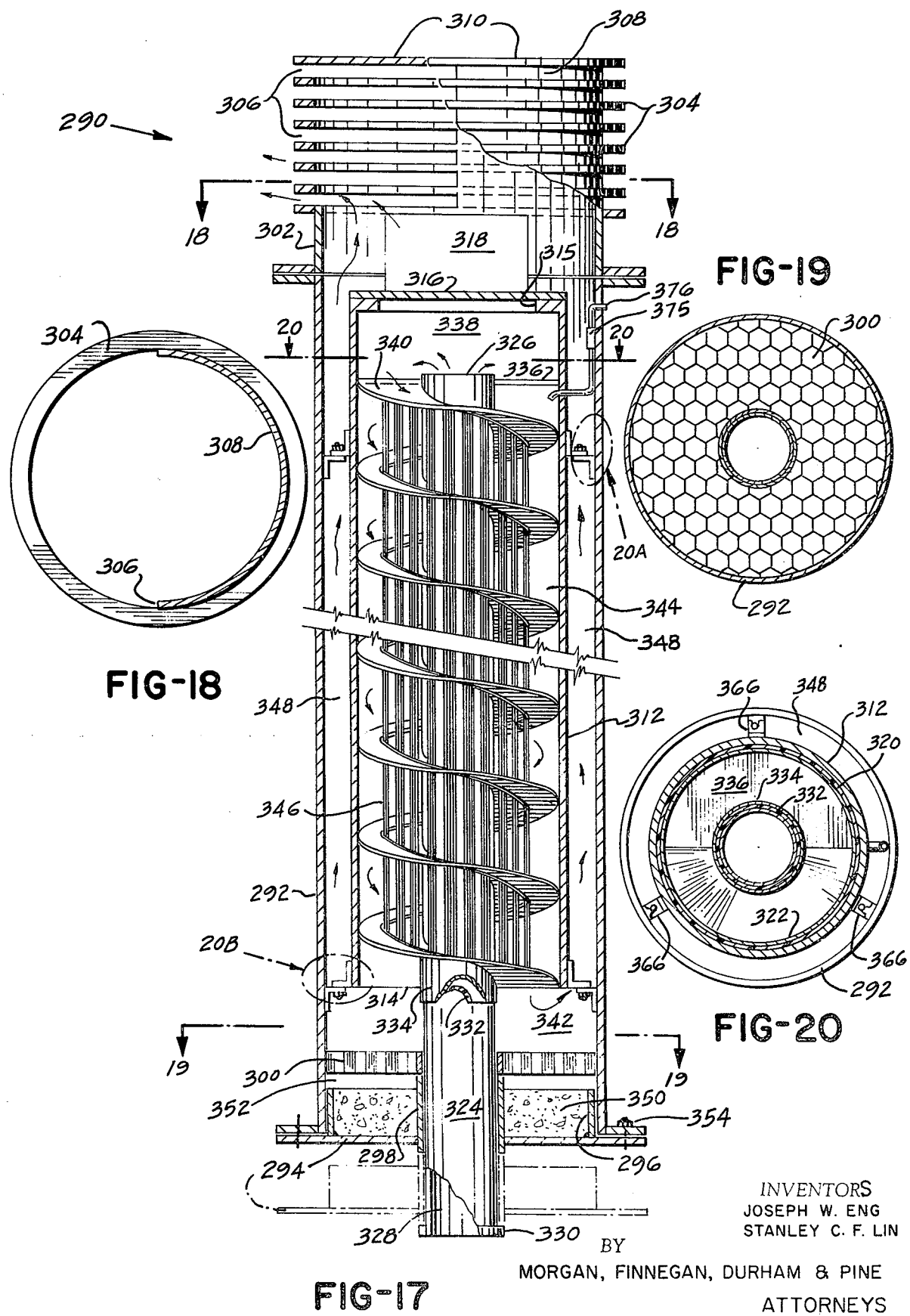

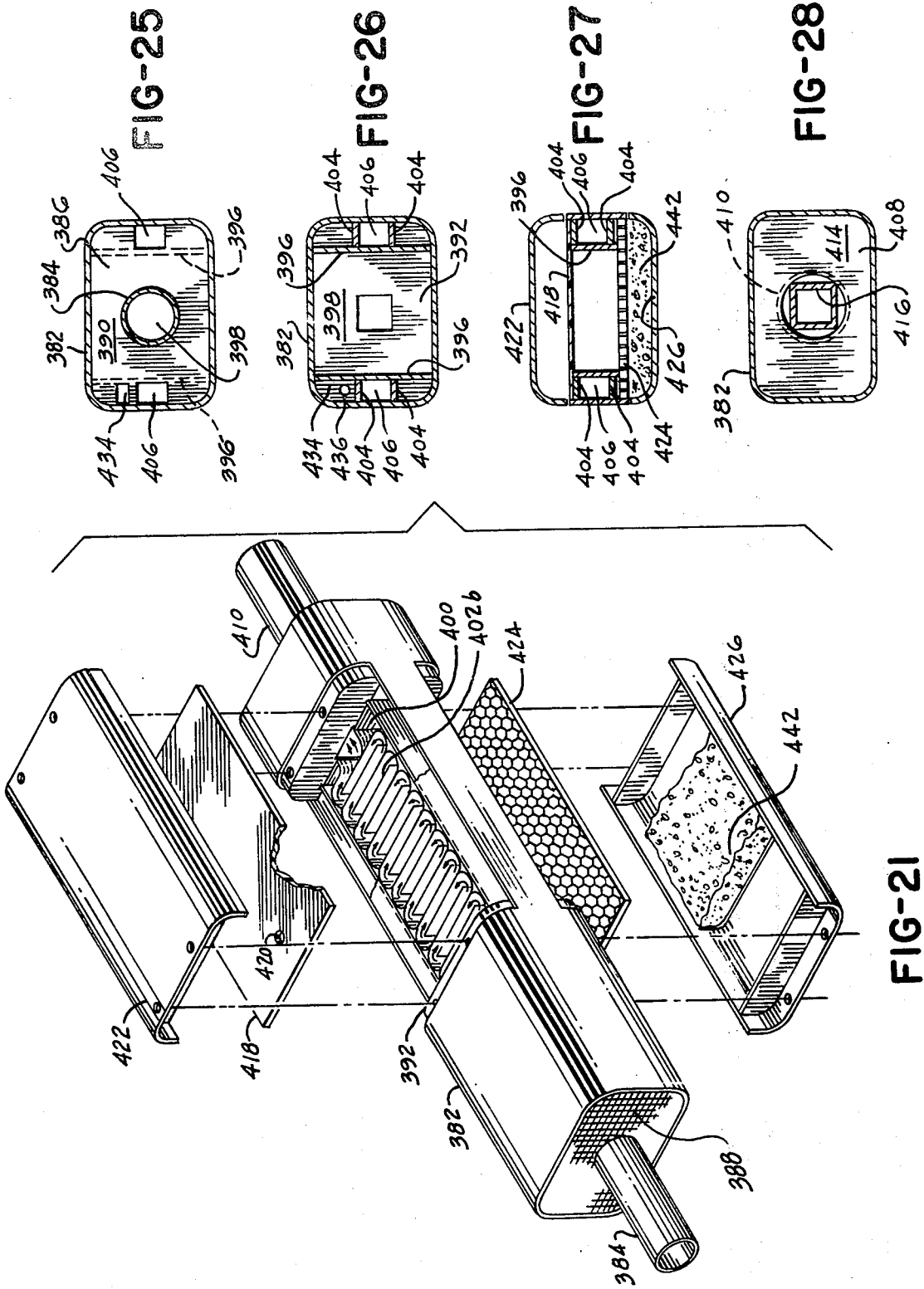

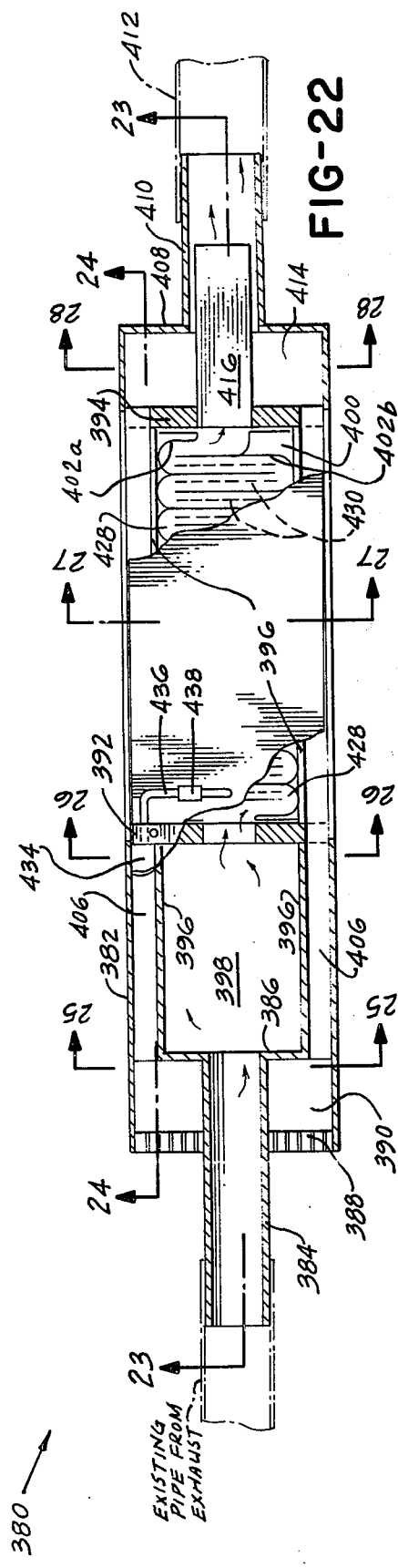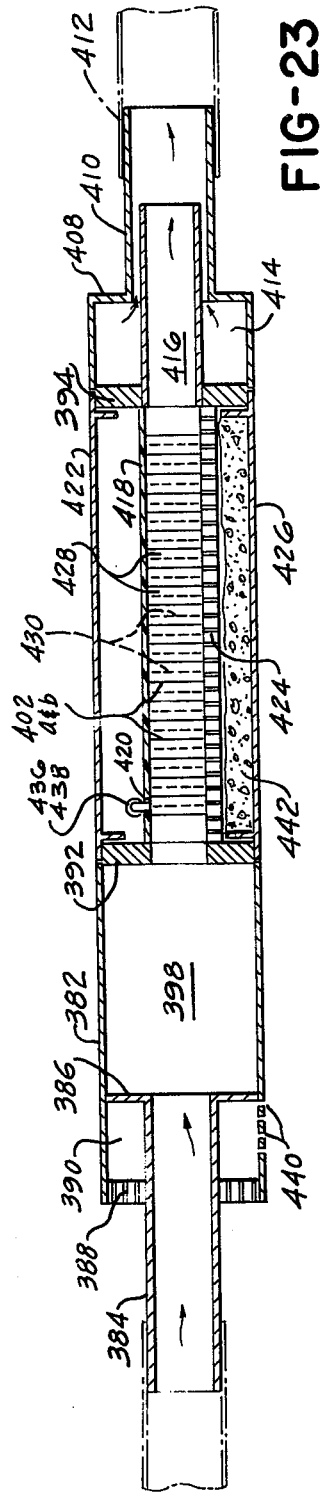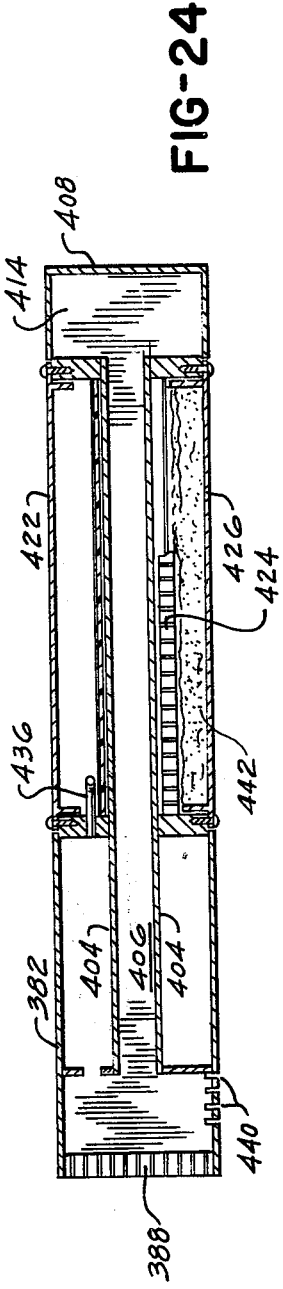

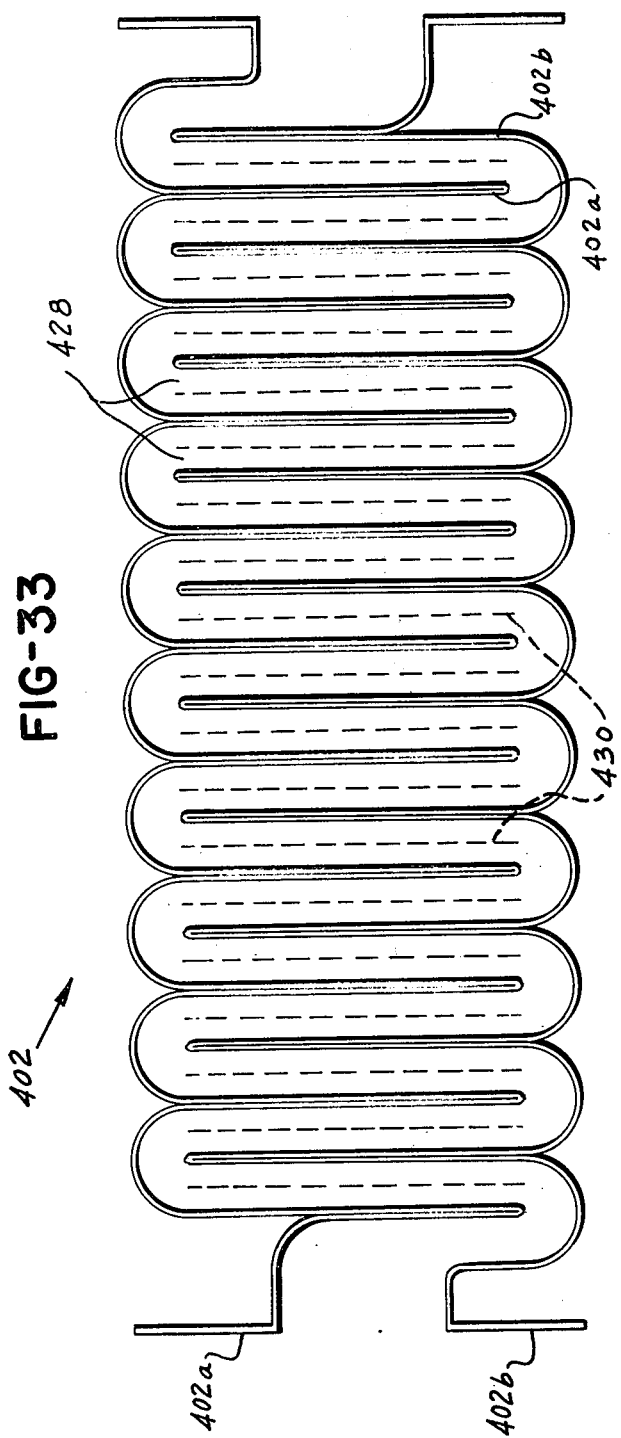
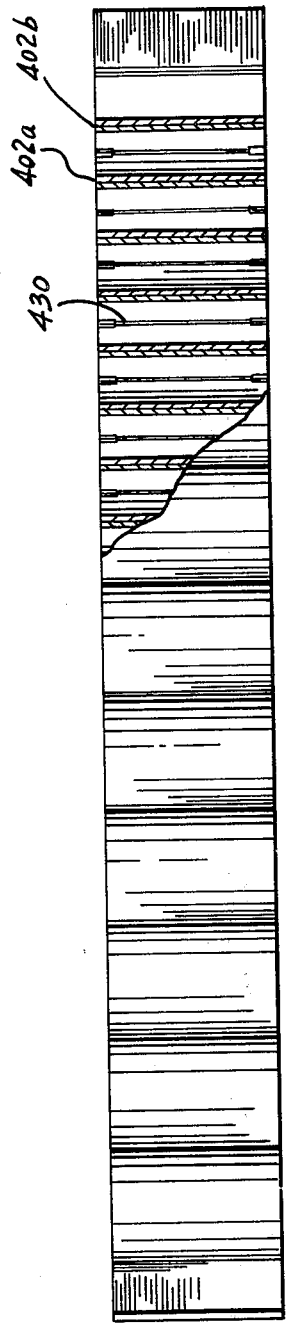
FIG-33
FIG-34

ELECTROSTATIC AND SONIC GAS PROCESSING APPARATUS

CROSS-REFERENCES

This is a continuation of application Ser. No. 245,756, filed Apr. 20, 1972, which is a continuation of Ser. No. 732,140 filed May 27, 1968, now abandoned, and a continuation-in-part of Ser. No. 664,416, filed Aug. 30, 1967, now U.S. Pat. No. 3,494,099, issued Feb. 10, 1970 in the name of the same inventors as this application which disclosure is hereby incorporated by reference in its entirety.

BACKGROUND OF THE INVENTION

Pollution of environments inhabited by human, animal or plant life is of grave and growing public concern. The discharge of inorganic and organic (such as carbon) particles and sulphur and carbon gases into the atmosphere from heat, power, vehicular and waste disposal combustion processes and other industrial processes is a prime example of pollution upon which a good deal of this concern is focused. Furthermore disagreeable odors and harmful bacteria which pollute the air are also of concern. In addition to man made polluted environments, attention has also been focused upon air containing natural elements which are undesirable to at least some groups of people, such as those allergic to pollen from certain plants.

Heretofore purification apparatus and methods intended to provide clean, pure and germ-free air environments have been beset with drawbacks.

For example, dry electrostatic precipitators and cyclone separators have not been, in general, satisfactory in removing solid and gaseous contaminants from gaseous streams. Higher chimney structures have also been found to be unsatisfactory not only because of increased costs, but because of the contaminants which are still ultimately discharged into the atmosphere. In addition, while presently available techniques are sometimes effective for removing large or coarse solid particles present in contaminated gaseous streams, no satisfactory means is available for inexpensively and effectively removing small micron and sub-micron sized solid particles. Accordingly, flue streams and other waste gases commonly carry fine injurious solid particles into the atmosphere. Some of the particles such as asbestos are known to cause serious lung disturbances. Others are potentially deleterious not only because of their effect on the human body by themselves but because many of the particles adsorb chemical pollutants and thus are synergistically harmful.

BRIEF SUMMARY OF THE INVENTION

The invention relates to a method and apparatus for purifying and removing contaminants from an untreated air and other gases with simultaneous multiple action electrostatic and ultrasonic agglomeration.

In general, the invention provides a new and improved method of air purification for industrial plants, such as factories where the workers or office personnel can receive a clean, pure, and germ-free air environment. Air purification is provided for offices, hospital rooms or wards, homes and home cooking areas; the air purification technique of the invention can be used to deliver clean and pure air to the carburetors of combustion engines, i.e. automobiles, trucks and buses.

In practicing the invention contaminants are removed from polluted gases with the selective utilization of two combined forces. They are high intensity pulsating electrostatic forces and high intensity frequency modulated ultrasonic forces. To further facilitate removal of contaminants centripetal and other baffling forces which change the direction of gas flow and the adhesive forces from oily vapors and other contaminants which may be present are used for agglomeration of contaminants.

In addition a fine fog dispenser and a negative ion dispenser can be employed in practicing the invention. The fine fog can also be electrically charged. The charged fog and negative ions together absorb odors, kill germs and also provide more effective agglomeration of solids in the polluted gases. The fog can be formed from either polar materials such as water or non-polar materials such as hydrocarbons, e.g. natural or synthetic oils.

In accordance with one embodiment of this invention, moreover, a negative ion dispenser and an ultraviolet ray lamp (commonly known as a black lamp) are positioned inside of the apparatus emitting pure air so that homes, offices and hospitals may have bacteria free purified air.

As the gases ladened with contaminants, such as dust and vapor which may be less than 1 micron in size, enter and flow through the apparatus of the invention they are subjected to sonic vibration and pulsating electrostatic forces. Such small particles of dust and droplets of liquid, if present, are reacted with these forces and they are made to move at rates and directions differing from those of the gases, whereby the particles and droplets remaining in suspension in the gases are caused to collide with each other by the forces of attraction and repulsion thus generated. Once the particles make contact they adhere to each other to form larger particles. This agglomeration process is repeated again and again until the particles formed are so large that they can no longer be suspended in the gases. At that point the agglomerated large particles drop to the floor and are removed from the gaseous streams.

The cleaning efficiency of the apparatus is also dependent upon the intensity and frequency of the sound waves generated, the time of exposure to vibration, the density size and number of the dust particles per unit volume of the gases, and the temperature of the gases. While agglomeration is possible at any temperature at which the gas-borne bodies remain in the solid phase, lower temperatures are preferable, because the volume of the gases is less and the dust density is greater. Furthermore, the required equipment may be smaller and less expensive when treating a given weight of gases at lower than at higher temperatures.

While the gas processing apparatus of the invention is primarily used for purification purposes it must be noted that it possesses characteristics which make it remarkably well suited for carrying out chemical reactions in a variety of ways. For instance, finely divided catalyst can be introduced into the apparatus with two or more gaseous components. Under the influence of the catalyst and the sonic and electrostatic forces within the apparatus, reactions can be carried out to yield either fluid or solid raction products. Instead of catalyst, the particles material introduced can be an adsorbent for the resultant product which can then be easily separated by the normal operation of the apparatus.

Rather than introducing particulate catalytic absorbent material with the gaseous stream, such adsorbents or catalysts can be used to line the conduit surfaces of the apparatus.

The apparatus presents a novel means of carrying out continuous reactions in a very short time and in a very small space. Thus the apparatus of the invention is a miniature reactor as well as an air or gas purifier.

DETAILED DESCRIPTION WITH PREFERRED EMBODIMENTS

The invention will be clearly understood by reference to the accompanying diagrammatic drawings in which a number of specific embodiments thereof will now be described in detail.

FIG. 1 is a cross-sectional view, taken on line 1—1 of FIG. 2, of an air purifier or processor of the invention particularly suited for industrial applications.

FIG. 2 is a plane view, in cross section, of such industrial air purifier showing an iris arrangement of electrodes of the invention with flow paths therebetween.

FIG. 3 is a longitudinal cross-sectional view taken on line 3—3 of FIG. 1.

FIG. 4 is a longitudinal cross-sectional view taken on line 4—4 of FIG. 1.

FIG. 11 is a plane view, partly in section, of a carburetor of the invention which purifies air containing oil fumes and which has a downwardly sloping spiral path formed by a planar helix electrode arrangement.

FIG. 12 is a side elevational view, partly in section, of the electrode cylinders and the electrode ribbons for the downwardly sloping spiral path of the carburetor shown in FIG. 11.

FIG. 13 is a longitudinal cross-sectional elevational view taken on line 13—13 of FIG. 11.

FIG. 14 is a view, partly in section, taken on line 14-14 of FIG. 11.

FIG. 17 is a side elevational view, partly in section, of a truck diesel exhaust of the invention having a downwardly sloping spiral electrode path.

FIG. 18 is a cross-sectional view taken on line 18—18 of FIG. 17.

FIG. 19 is a cross-sectional view taken on line 19—19 of FIG. 17.

FIG. 20 is a cross-sectional view taken on line 20—20 of FIG. 17.

FIG. 21 is an exploded view of one embodiment of the invention for the engine exhaust of automobiles, trucks and buses, and includes a long electrode path having a serpentine pattern with a turbulence chamber for both agglomeration of polluted particles and for reducing or deadening noise.

FIG. 22 is a plane view, partly in section, of FIG. 21.

FIG. 23 is an elevational view in cross-section taken on line 23—23 of FIG. 22.

FIG. 24 is an elevational view in cross-section taken on line 24—24 of FIG. 22.

FIG. 25 is a side view, in cross-section, taken on line 25—25 of FIG. 22.

FIG. 26 is a side view, in cross-section, taken on line 26—26 of FIG. 22.

FIG. 27 is a side view, in cross-section, taken on line 27—27 of FIG. 22.

FIG. 28 is a side view, in cross-section, taken on line 28—28 of FIG. 22.

FIG. 33 is an enlarged plane view, in section, of the serpentine electrode shown in the air purifier of FIG. 21.

FIG. 34 is a side elevational view, partly in section, of the serpentine electrode arrangement of FIG. 33.

FIGS. 1, 2, 3 AND 4

Figure 6:
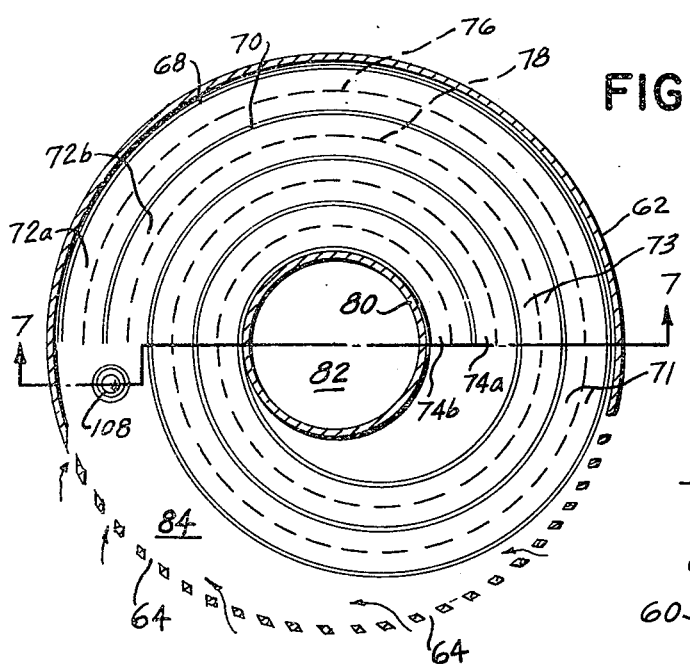
FIG. 6 is a plane view, in cross-section, taken on line 6—6 of FIG. 5, showing an electrode formed bifilar helix path for the gas flow.

Referring now to FIGS. 1, 2, 3 and 4 in detail, there is shown a gas processor, such as an air purifier 10, having a cylindrical casing 12 and a shallow hopper base 14 connected to the bottom of casing 12. Affixed to the top of the casing 12 is a circular plate 18 with a central opening 20 therethrough. Mounted atop the plate 18 above opening 20 is a discharge nozzle 50 which has a somewhat larger diameter than casing 12. Extending into opening 20 and depending from plate 18 is a tube 20 which forms passage 22.

The upper portion of casing 12, has a plurality of slot openings 24, disposed both longitudinally and horizontally throughout a 360° radius which are separated only by spacers 26. Housed within casing 12 are a series of stationary electrode assemblies 28 which extend from casing 12 at spacers 26, toward center path 30.

The stationary electrode assemblies 28 are vertically supported by a platform 32 whose upper surface defines an inclined circular plane and whose bottom vertical portion extends downward and is connected to base 14.

The tangential arrangement of stationary electrode assemblies 28, forms inlet air flow passages 34 as shown in FIG. 2. Between each pair of electrodes 28 and in the flow passage 34 there is located a plurality of thin, flexible, vibratable, ribbon electrodes 36.

Located on the bottom vertical portion of platform 32 below passage 22 is a circular honeycomb grill 38 atop of which is secured an air flow guide 40 through grill 38 by locknut 42.

A specific operation of air purifier 10 is described. The gaseous medium to be treated enters slot openings 24 and flows into inlet passages 34. High intensity pulsating electrostatic and high intensity sonic forces generated through the interaction between stationary electrodes 28 and vibrating electrodes 36, give rise to ultrasonic frequencies, which in turn simultaneously activate electrostatically, and impart oscillation to particles causing agglomeration of polluted particles which is further helped if oily fumes are present. Further separation of fine particles is accomplished while passing through path 30 by means of centripetal force, imparted by the air flow which is moving downward with a cyclone effect. The cleaned air then enters at the lower end of passage 22 and is discharged upwardly.

The polluted and oily particles are both trapped by honeycomb grill 38 and collected by hopper base 14. These polluted particles can then be discharged through outlet 16 by opening butterfly valve 44.

An impeller type fan 45, driven by electric motor 48, generated the force providing the circulating air flow, in that it draws in cleansed air from passage 22 to pass through a large capacity radical distribution air diffuser 50 including a top cover 54 and vertical support member 56. In so doing, the gaseous medium to be treated is drawn into the casing 12 through slot openings 24.

The air purifier 10 is supported by a set of four typical legs 52.

Beneath platform 32, there is an annular compartment 58 which can be used for installing and housing a high voltage generator (not shown) so that the apparatus can be self-contained.

FIGS. 3 and 4 show detailed views of a portion of the stationary electrode assemblies 28, and the flexible vibratable ribbon electrodes 36, respectively. Each stationary electrode assembly 28, has an electrical insulation 28c separating stationary electrode conductors 28a and 28b. Each flexible vibratable ribbon electrodes 36 includes ribbons 36a fixedly positioned by binders 36b.

FIGS. 5, 6, 7 AND 8

Figure 5:
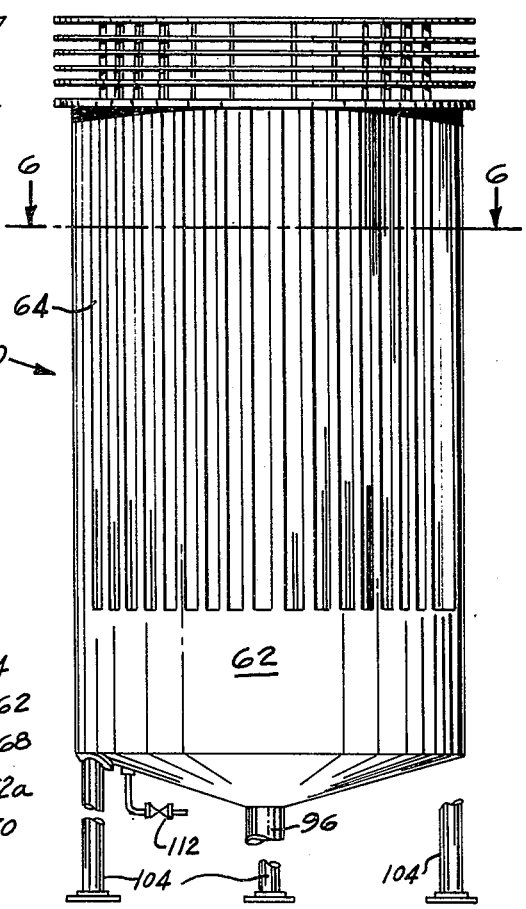
FIG. 5 is a longitudinal view in side elevation of another embodiment of an air processor or purifier of the invention.
Figure 7:
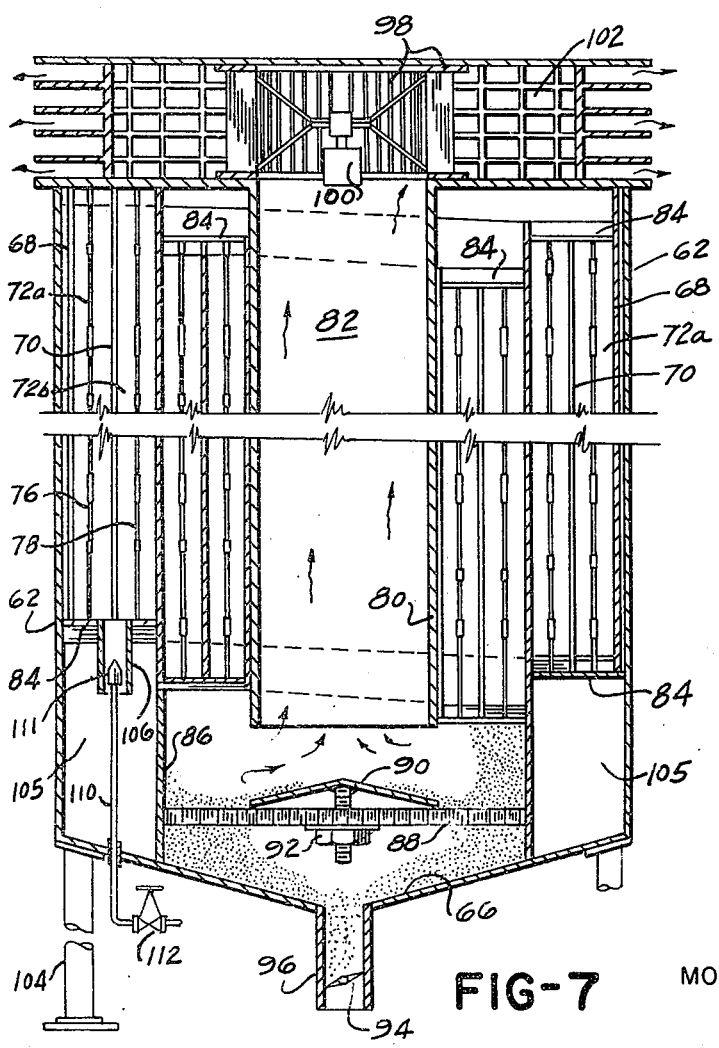
FIG. 7 is a longitudinal cross-sectional view taken on line 7—7 of FIG. 6.

FIGS. 5, 6 and 7 are different views of another air processor or purifier 60 having a cylindrical casing 62, a series of long vertical slot openings 64, together with shallow hopper base 66.

The interior of said casing 62 has a continuously outer spiraling stationary electrode 68, and continuously spiraling inner stationary electrode 70, which electrodes are parallel to each other and define two spiral passage 71 and 73, having passage inlets 72a and 72b and outlets 74a and 74b.

Within the spiral passages 71 and 73 there is a pair of continuously spiraling flexible ribbon electrodes 76 and 78 parallel in their curvature to that of stationary electrodes 68 and 70 and which extend to center tube 80, whose interior walls define passage 82. In order to rigidly support the above described electrodes both top and bottom plates 84 are provided.

A honeycomb grill 88 is attached to hopper base 66, inside of isolated wall 86, and air flow guide 90, is secured by a locknut 92, through grill 88.

A specific operation of air purifier 60 is described. Gaseous medium to be treated enters slots 64, flows into passage inlets 72a and 72b. The polluted particles are then agglomerated since they are forced to oscillate by the impartation of high intensity pulsating electrostatic and sonic forces upon them. The oscillating electrode preferably connected to a negative potential terminal. As it oscillates it also dispenses negative ions. The negative ions generate a zone which oxidizes gases and aids removal of odors and assists killing germs.

The polluted particles then fall on bottom plate 84 and flow along the curvature through outlets 74a and 74b and are collected at hopper base 60. These polluted particles are removed from the apparatus by opening butterfly valve 94, located in bottom nozzle 96.

The cleansed air leaves the electrode passages 71 and 73, hits air flow guide 90 and flows upwardly into pure air passage 82. An impeller type fan 98 driven by an electric motor 100 generates circulating air flow, in that it draws in cleansed air from passage 82 and passes it through a large capacity radial distribution air diffuser 102.

Diffuser 102 is supported by air purifier 60 which in turn is supported by a set of (4) typical legs 104. Between inner casing 62 and outer wall 86, a compartment 105 is provided for installation and housing of a high voltage generator (not shown), so that the apparatus can be entirely self-contained.

In addition to the dry process of agglomerating polluted air described above, there is optionally available a fog generator 111 housed by an open ended nozzle 106, extending downwardly through bottom plate 84. Fog generator 111 is connected to high pressure liquid supply pipe 110 and shut-off valve 112.

In operation, under high pressure, fine fog passes through a hole 108, at the top surfaces of bottom plate 84, rises upwardly then enters passage inlets 72a and 72b and is then carried by the air stream which comes through slots 64.

These fine fog droplets can be electrically charged and activated by the high intensity pulsating electrostatic and sonic forces generated by the interactions between the above described electrodes. The fine fog together with negative ions and the simultaneous actions of the pulsating electrostatic field and high intensity ultrasonic field enables this apparatus to agglomerate a wide range of fine solid particles, to remove odor and to kill airborne bacteria.

Figure 8:
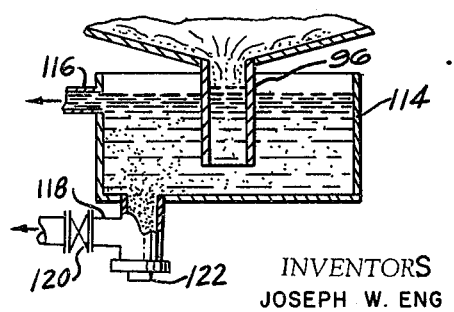
FIG. 8 is a sectional view of the discharge portion of an air purifier showing the discharge of et processed polluted particles.

For the wet processing option described immediately above a modification to drain 96 is described and shown in FIG. 8. A particular preferred embodiment of such a modification consists of a water seal container 114, overflow nozzle 116, slurry drain 118, drain valve 120 and slurry cleanout 122.

The electrode describe a bifilar helix arrangement. For further description and detail see FIGS. 36, 37 and 41.

FIGS. 9 AND 10

Figure 9:
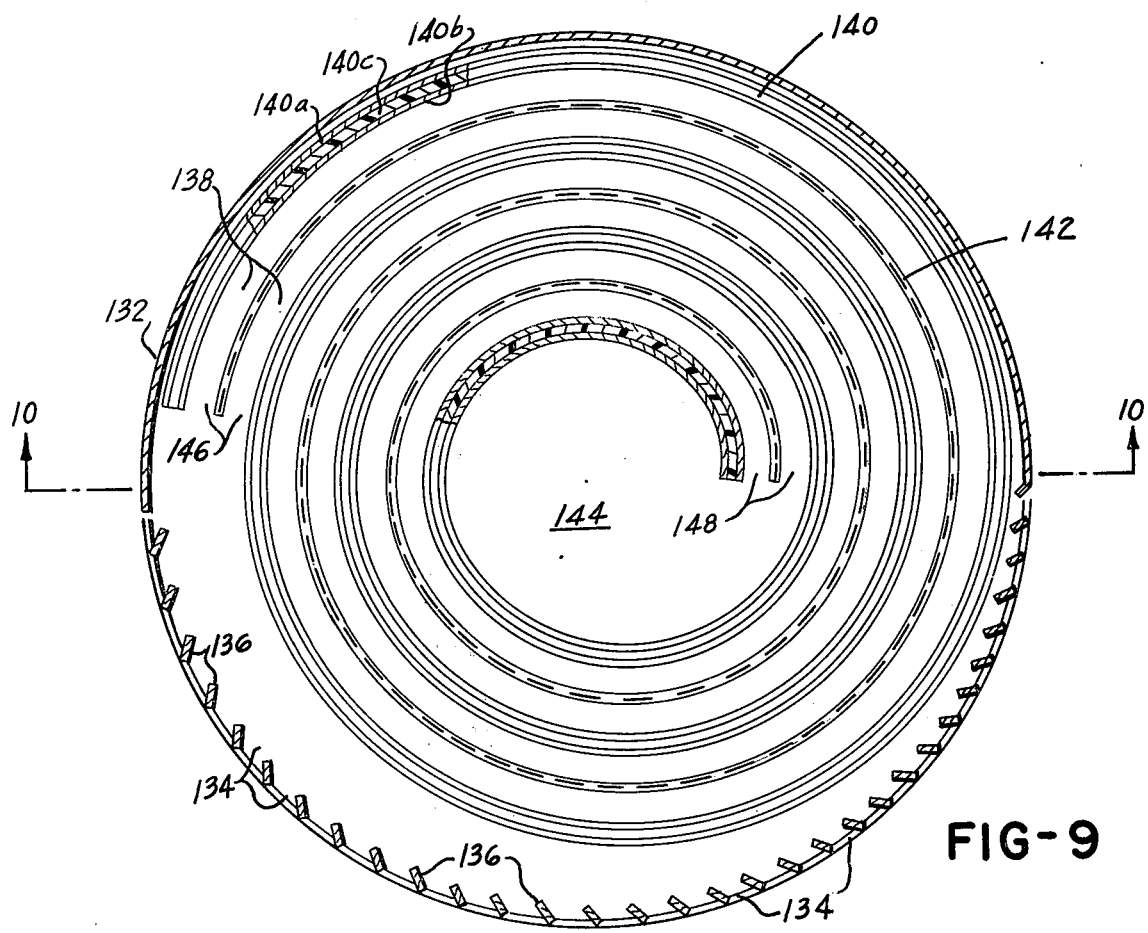
FIG. 9 is a plane view, in cross-section, of another embodiment of an air purifier of the invention with a longitudinal planar helix electrode arrangement suitable for homes, offices and hospital rooms.
Figure 10:
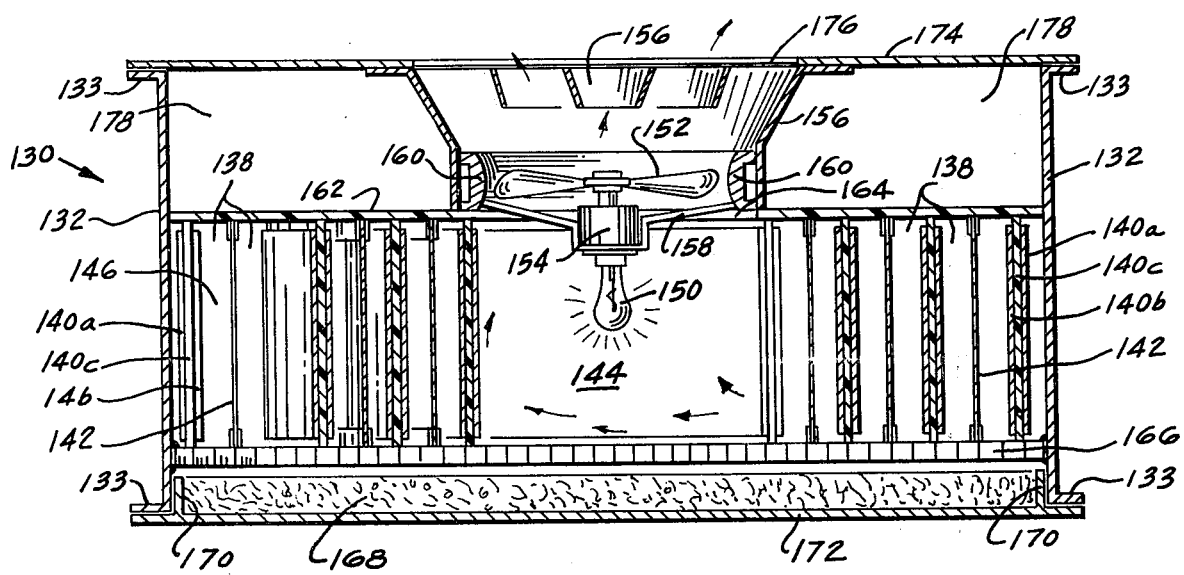
FIG. 10 is a cross-sectional elevation view taken on line 10—10 of FIG. 9.

FIGS. 9 and 10 show another embodiment of the basic principle of this invention. Air processor (purifier) 130 is an embodiment particularly well-suited for use in hospitals, offices and homes. Purifier 130 has an open ended cylindrical casing 132, with end flanges 133, at the lower and upper portions of casing 132 and with partly perforated vertical slot openings 134 defining entry flow guides 136. Within casing 132, there is a set of electrode assemblies which form a planar spiral flow path 138, the path being composed of stationary electrode assembly 140 and then flexible vibratable electrode ribbons 142. Both electrodes 140 and electron ribbon 142 are parallel and extend along a curved path to the center pure air chamber 144.

The stationary electrode assembly 140 consists of a layer of electrical insulation 140c separated by conductive electrode plates 140a and 104b.

In a specific operation, the untreated, undesirable contaminated air enters slots 134 and where it is directed by flow guides 136 and the wall of electrode assembly 140 to flow through inlet 146. Polluted particles in the contaminated air are agglomerating because of the same type of action as described above in connection with the apparatus of FIGS. 1, 2, 3 and 4, while the air stream passes through flow path 138. The cleansed air leaves outlet 148 to pure air chamber 144. In addition to the germicidal action of the negative ions an ultraviolet source 150 (commonly known as a black lamp), is provided optionally to destroy the escaped microorganisms that might be present. The pulsating electrostatic field besides generating ultrasonic field, it also removes all airborne ions. The removal of air borne ions prevents the dust particles from getting charged and thus makes cleaning easier.

Fan 152 driven by electric motor 154 generates a circulating air flow, that draws in contaminated air through openings 134 and cleaned and sterilized air from pure air chamber 144 and passes the cleaned air through an air diffuser 156, which in turn distributes the cleaned air in an upward direction.

In securing ultraviolet source 150, a mounting bracket 158 is adapted to fit within the fan unit flange 160 and under the motor.

To restrict air flow to the confined area within flow path 138, a non-conductive cover plate 162, with an opening 164, is provided.

A honeycomb grill 166, supports both electrode assemblies 140 and 142 and the polluted particles are trapped through grill 166, and collected by a replaceable layer of porous foam material mat 168, fitted in the inside of an annular edge 170 of flanged removable base 172. Annular edge 170 is a slip-in-type which fits into the inner surface of lower end of casing 132. A circular cover 174 having pure air outlet opening 176, is screwed onto the upper end of casing 132.

A compartment 178 is provided for the installation and housing of a high voltage generator (not shown) to make the unit self-contained.

FIGS. 11, 12, 13 AND 14

FIGS. 11, 12, 13 and 14 illustrate an embodiment of an oil vapor and air processor or purifier embodying the invention, which is adapted for use with any of the well-known types of carburetor. Air purifier 180 has a circular top portion plate 182, a supporting rod sleeve 189, a side preferred air intake grill 184. Under the grill, there is ring flange 186 with tangentially oriented flow guides 188.

Interior cylindrical electrode 190 has its upper end welded into the underside of top portion plate 182 and extends downwardly. Outer cylindrical electrode 192 also has its upper end fitted and welded to the under surface of ring flange 186 and extends downwardly. A thin uniform width plate 194 whose outer edge is connected perpendicularly to electrodes 192 and whose inner edge is connected to electrode 190 forms a planular downwardly sloping spiral around electrode 190 defining flow path 196. In the center of flow path 196 bounded by electrodes 190 and 192 between points on the lower and upper surface of thin plate 194 are vertical thin flexible vibratable ribbon electrodes 198 which start from the underside of spiral plate 194 where they are connected to flange 186.

Preferably the space between the bottom end edges of electrodes 190 and 192 should be equal to one-half of the width of flow path 196.

A hose inlet connection 200 radially oriented 30° horizontally from path entrance 220 extends through the wall of the outer electrode 192 with a 60° angle cut opening 202, and faces the direction of air flow.

It will also be observed that removable partition 204 is provided and located at the mid-point of electrode 190, which forms two separate compartments, the upper compartment 205 is for installation and housing of a high voltage generator (not shown) and the lower compartment with an open bottom is a pure air chamber 206.

At the lower center of air purifier 180 there is a lap joint long neck adapter 208. If the upper portion of adapter 208 is partly inserted upwardly to the open end of pure air chamber 206 when the various parts are assembled, then there will be formed pure air passage 210.

At the bottom of air purifier 180 there is a cylindrical open top metal shell 214, with its bottom plate having an opening 212 which is fitted to the outside annular surface of the long neck adapter 208 and is welded to the shoulder of lap joint 216. An air space is also provided between the upper edge of long neck adapter 208 and the underside of partition 204. The edges defining this air space are not less a distance apart than the distance between the inside wall surface of electrode 190 and the outside wall surface of long neck adapter 208.

A "U" shape cutout 218 is shown in detail in FIG. 14 and is provided to clear the hose connection 200 for removal of electrode assemblies from metal shell 214.

In operation, the dirty, untreated air enters through the perforated air intake grills 184, then the air stream is uniformly directed by the flow guides 188 and spiral plate 194. The incoming air passes the oil fume discharge at the point of mitre cut opening 202, the oil fumes are carried to passage entrance 220 by the air stream and continue to follow the curvature of spiral page 196.

Both oil fumes and dirty air are being processed and agglomerated simultaneously by the method of this invention which utilizes the high intensity pulsating electrostatic and sonic forces, created from the vibrating electrode ribbons to impart oscillation in contaminant particles. Thus, the pollutant and particles agglomerate and are separated by gravity from the gases, the particles then fall upon the surface (preferably teflon) of spiral plate 194 with its smooth and slippery down slope and slide down to the foot of flow path 196 and are collected by a replaceable layer of porous foam, mat 222.

The cleaned air leaves the flow path 196, changes its direction and enters upwardly into pure air chamber 206. The purified air is attracted then by vacuum through passage 210, to the carburetor when the engine is in motion.

Rod 224 which is usually provided with the carburetor slides through sleeve 189. An air-tight non-metal washer 226 secures the air purifier 180 to the carburetor by wing-nut 228.

FIGS. 15 AND 16

Figure 15:
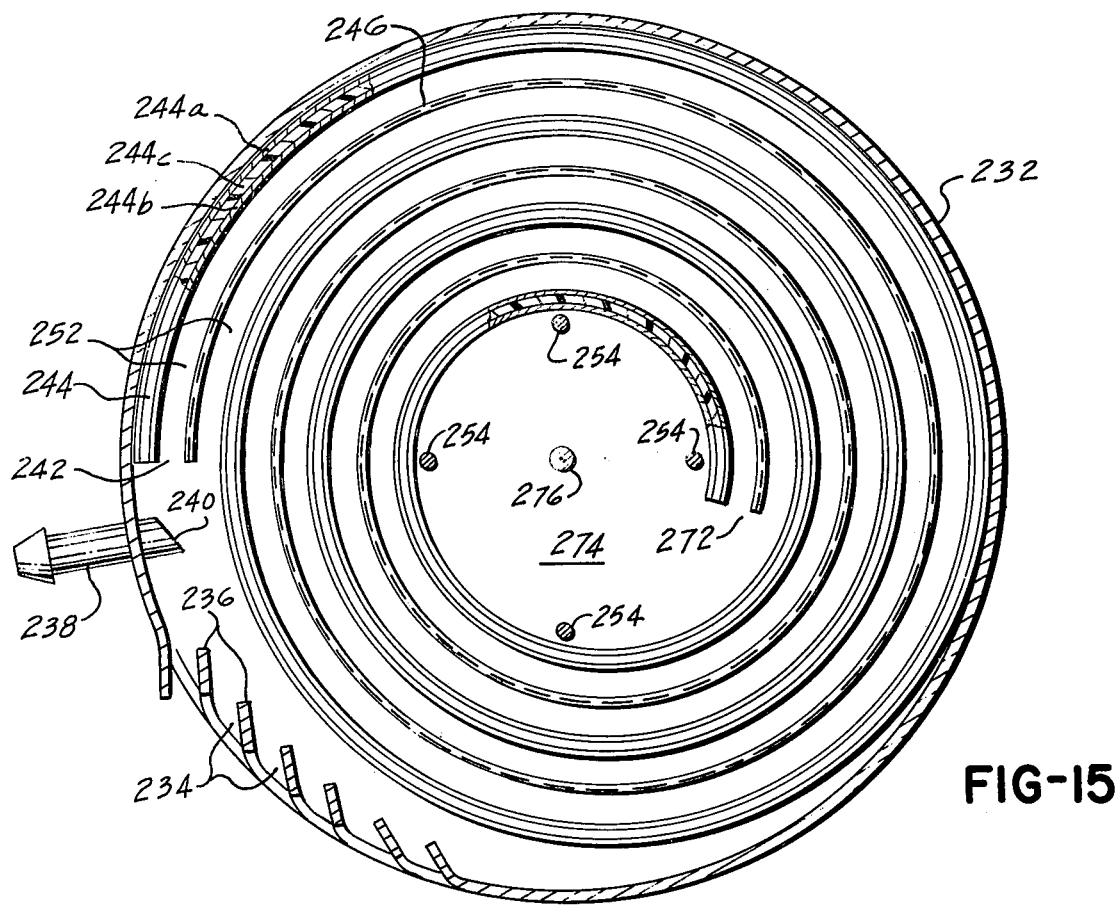
FIG. 15 is a plane view, in cross-section, of another carburetor of the invention with a curved flow path formed by a planar helix arrangement of electrodes.
Figure 16:
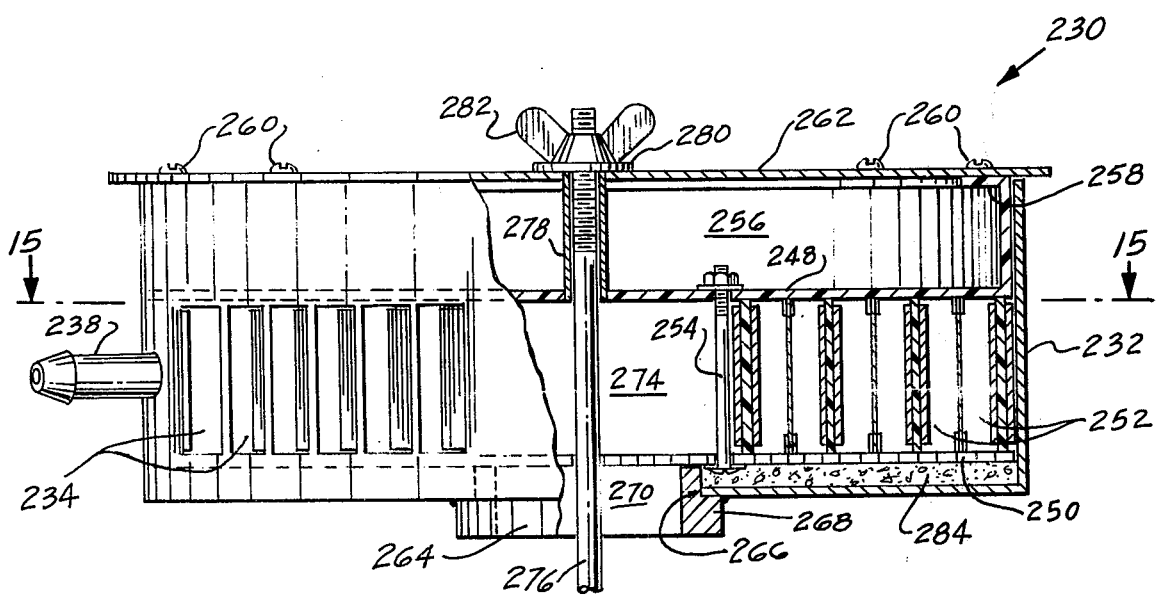
FIG. 16 is a side elevational view, partly in section, of the carburetor shown in FIG. 15.

FIGS. 15 and 16 illustrates another specific embodiment of the oil vapor and air processor or purifier of the invention, which is also adapted for use with any make carburetor. The air purifier 230 has an open top circular casing 232, with a series of stamped out vertical slots 234 in its outer periphery which form air flow guides 236.

Casing 232 also has an oil vapor inlet hose connection 238, which is inserted through the wall of metal casing 232 with a 30° angle mitre-cut opening 240. The oil vapor hose connection 238 is oriented at a 15° angle horizontally from entrance 242.

The untreated, dirty air enters slots 234 in a uniformly directed air stream by means of flow guides 236. The air flows through path inlet 242 and flow path 252 following the curvature of the planar helix arrangement of stationary electrode assembly 244, and vibrating flexible thin ribbon electrode 246.

The top of these electrodes is covered by a non-metal tray section base 248 and the bottom is supported by a honeycomb grill 250. The stationary electrodes 244 and vibrating electrodes 246 are secured between base 248 and grill 250 and form flow path 252, and are held together by a set of typical long machine screws wit nuts 254.

Annular compartment 256 is provided for the installation and housing of a high voltage generator (not shown). To close the compartment 256 a set of eight (8) sheet metal screws 260, equally spaced fastens non-metal edge 258 to cover plate 262.

A short neck lap-joint adapter 264 is fitted through the bottom opening 266 of metal casing 232. Lap joint shoulder 268 of adapter 264, is welded onto casing 232 forming a passage 270, right under the center portion of honeycomb grill 250.

In operation, the cleansed air leaves the path exit 272 (after being processed by procedures similar to those described in FIGS. 9 and 10), and enters pure air chamber 274; the pure air then is pulled by the vacuum through passage 270 to the carburetor when the engine is running.

Rod 276 is usually provided with the carburetor, and slides through sleeve 278. An air-tight non-metal washer 280 secures the oil purifier 230 to the carburetor by a wing-nut 282.

In the flow path 252, gummy polluted particles fall through the honeycomb grill 250 where they are collected by a layer of replaceable ring type, porous foam mat 284. To change the foam mat 284 one simply unscrews wing-nut 282 by lifting up the electrode assemblies from metal casing 232.

The stationary electrode assembly 244, consists of a layer of electrical insulation 244c separated by electrode plates 244a and 244.

FIGS. 17, 18, 19 AND 20

FIGS. 17, 18, 19 and 20 illustrate another specific embodiment of an air cleaner in the form of an upright air purifier 290 having flanged ended metal casing 292, connected to bottom tray assembly 294 with annular tray edge 296 and center sliding sleeve 298, and honeycomb grill 300, a part of assembly 294.

At the top, flanged-end diffuser 302 is made up of at least 7 ring type circumferential fins 204, forming 180° horizontal slot openings 306. Openings 306 are exactly opposite the enclosing portion 308 of a cover plate 310. Portion 308 has a uniform air-cooling gradient, by which heat is transferred through the ring fins 30 while at the same time, the pure-air outlet slot openings 306 also receive natural cooling air which is guided by fins 304.

Cylindrical electrode 312 has an open bottom 314 and a top access hole 315. A circular cover plate 316 covers access hole 315 and serves as the base of cabinet 318 (suitable for a high voltage generator — not shown).

Electrode enclosure 312 is insulated throughout its inner surface by electrical insulator 320 (shown in detail in FIG. 20) then lined with a layer of thin conductive metal forming an outer stationary electrode 322. A long metal tube 324 extends upwardly through enclosure 312 and has a top open end 326 and a bottom open end 328. A stop ring 330 is fitted and welded to the outside surface of bottom end 328.

A layer of electrical insulator 332 is wrapped around the outside surface of metal tube 324 and is then covered with a layer of thin metal over the insulator 332, which forms an interior stationary electrode 334.

The insulator 332 and interior electrode 334, start from the point above honeycomb grill 300 and extend upwardly to the top end 326 of metal tube 324.

A semi-circular guide plate 336 having a center semi-circular cutout is welded to top end 326 of metal tube 324. The outside semi-circular edge of guide plate 336 is welded around the inner surface of outer stationary electrode 322. A chamber 338 results from the combination of guide plate 336 and electrode 322.

One side of the straight edge of guide plate 336 is connected with spiral plate 340 (which is preferably teflon or a similar low coefficient of friction plastic) which spirals down to pure air chamber 342 at the foot of electrode enclosure 312.

Spiral plate 340 is closed on both sides by stationary electrodes 322 and 334 which form an air flow path 344. In the center of the latter, there is vertically placed continuously spiraling flexible vibratable ribbon electrode 346 which follows the curvature of spiral air path 344.

In operation the exhaust gas flows through the center pipe 324 and enters the top air chamber 338. The flow direction subsequently changes due to the restriction of the chamber. The new flow direction follows the spiral path 344 until the gas flow reaches the bottom air chamber 342. At the top of the spiral path the hot exhaust gas is mixed with cool air from a small air pipe 376. This air pipe is connected through a check valve 378 which allows cool air to pass through but not the hot gas. The added fresh air not only helps to cool the hot gas but also helps to oxidize the incompletely burned hydrocarbon products. As the mixture of hot gas and air flowing through the spiral path, the solid particles are agglomerated by the combined pulsating electrostatic field and ultrasonic field. The agglomerated matters then slide down the spiral plate through the bottom air chamber 342, the honeycomb grill 300 and then collected by the porous foam mat 350. The mixture by the time it reaches the bottom air chamber 342, has been thoroughly purified and is leaving the chamber through the annular air path 348 and passes the slot openings 306, through which the purified mixture is discharged into the atmosphere.

Oily, polluted particles are trapped through honeycomb grill 300 and collected by a replaceable layer of porous foam or fabric mat 350. Air space 352 is required between the underside of honeycomb 300 and the top surface of foam mat 350 to prevent overfilling the holes of the honeycomb by the carbon powder or polluted particles before they can be collected and adsorbed by foam mat 350.

Foam mat 350 is removed by simply unthreading machine screws 354 at the lower flange end of metal casing 292, sliding down the bottom tray 294 and resting it at stop ring 330.

FIGS. 20A AND 20B

Figure 20A:
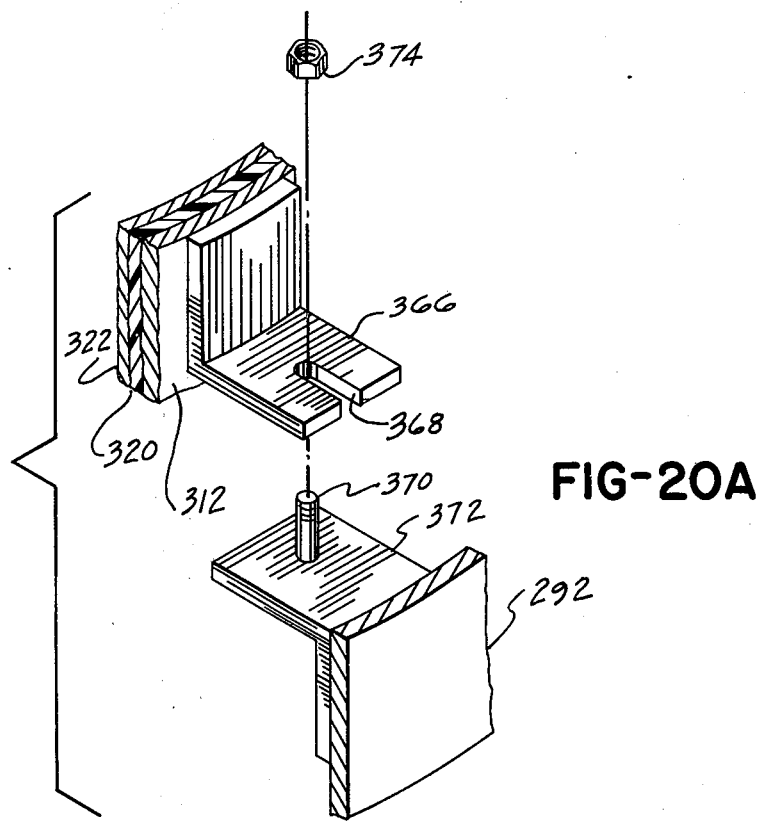
FIG. 20A is a detailed exploded view of the upper portion internal supporting lugs and brackets of the exhaust shown in FIG. 17.
Figure 20B:
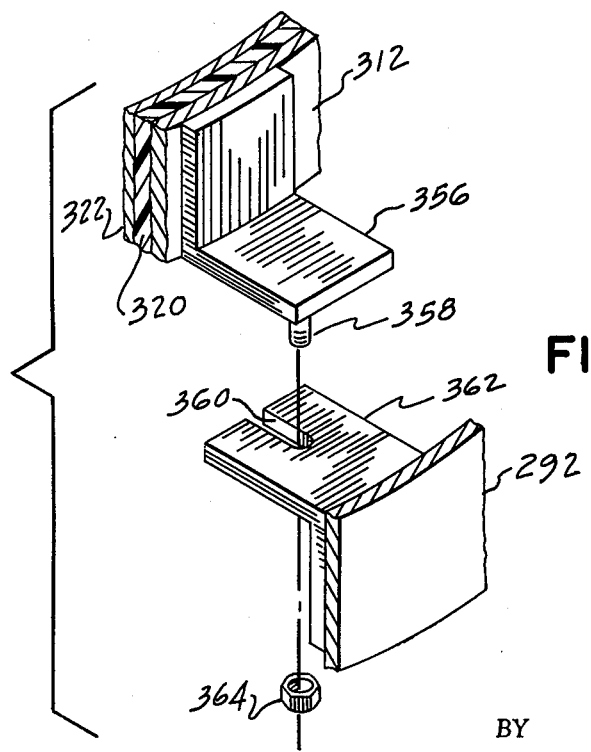
FIG. 20B is a detailed exploded view of the lower end internal supporting lugs and brackets of the exhaust shown in FIG. 17.

Reference is now made to the detailed assemblies of FIGS. 20A and 20B. In order to secure electrode enclosure 312 at open bottom 314, a set of 3 metal lugs 356 each of which are provided with machine screw 358 extending downwardly to engage with open end slot 360 of casing bracket 362 and is fastened by lock nut 364.

At the upper portion of electrode enclosure 312, there is provided also a set of 3 metal lugs 366 each of which have open end slot 368. Slot 368 engages machine screws 370 of casing bracket 372 which is secured by lock nut 374.

FIGS. 21 TO 28

FIGS. 21 through 28 inclusive are illustrations of a combination muffler and air purifier apparatus 380, comprising a muffler outer casing 382, a length of exhaust flue inlet tube 384 which extends to flue transition plate 386.

In front, shown in FIG. 22, there is a fresh air (honeycomb) inlet grill 388, from which air passage 390 runs. In the central portion of casing 382 there is an electrode front head plate 392 and an electrode rear head plate 394. A set of side wall inner casings 396 are provided with the front portion extending from flue transition plate 386 to front head plate 392 to form a turbulent chamber 398, and with the rear portion of inner casings 396 extending from the front head plate 392 to the rear head plate 394 to form compartment 400 for serpentine pattern stationary electrodes 402a and 402b.

On both sides of tubulent chamber 398 (see FIG. 26) there are narrow top and bottom plates 404 which extend from air inlet passage 390 to rear head plate 394 to form fresh air cooling paths 406 which run on each side of flue turbulent chamber 398 and electrode compartment 400.

Muffler end plate 408 (see FIG. 28) is welded to clean air discharge tube 410 and extends to a required length and is connected to the existing tail pipe 412. A cooling air chamber 414 into which paths 406 flow is formed by rear head plate 394 and muffler end plate 408. A square longitudinal cleansed air tunnel 416 extends from electrode rear head plate 394 through clean air cooling chamber 414 and is inserted to its mid-length in clean air discharge tube 410.

The central portion of purifier 380 (FIG. 21) above the electrode compartment 400, has a heat resistance seal plate 418 with fresh air tubing opening 420 and a top enclosure 422. At the underside of the said compartment 400 there is a honeycomb supporting grill 424 and bottom enclosures 426.

In a preferred embodiment of the invention there is an electro-acoustic agglomerator to aid in removing mist and solids from the exhaust fumes and deadening the exhaust noises.

In operation, the hot exhaust fumes enter the flue inlet tube 384 and flow into turbulent chamber 398. These hot exhausts immediately are reduced in velocity and temperature by means of cooling and turbulent action. The partly cooled fumes are forced through the front head plate 392 and flow in the multiple zig-zag electrode path 428.

By means of the electrostatic and sonic forces generated by stationary electrodes 402a and 402b and vibrating ribbon electrode 430 solid particles are removed and the exhaust noise is reduced by thoroughly diffusing the sound waves.

To provide heat transfer from electrode path 428, a cool air stream is simultaneously flowed through fresh air inlet grill 388, into air passage 390, then is flowed into dual cool air paths 406, which are provided on both sides of electrode path 428, and flue chamber 398 and electrode compartment 400. The cool air paths 406 carry the air stream through the cooling air chamber 414 and continues to flow into clean air discharge tube 410 along the sides of cleansed air tunnel 416.

A separate fresh air intake path 434 is also provided for supplying fresh air for further cooling and oxidation of pollution gases, through air inlet tubing 436 and restricted back-flow check valve 438.

Condensation drain slots 440 are provided at the bottom of air inlet passage 390.

The polluted solid particles and oily mist are trapped in honeycomb grill 424, and collected by a replaceable porous packing material 442, which is housed by bottom enclosure 426.

FIG. 29

Figure 29:
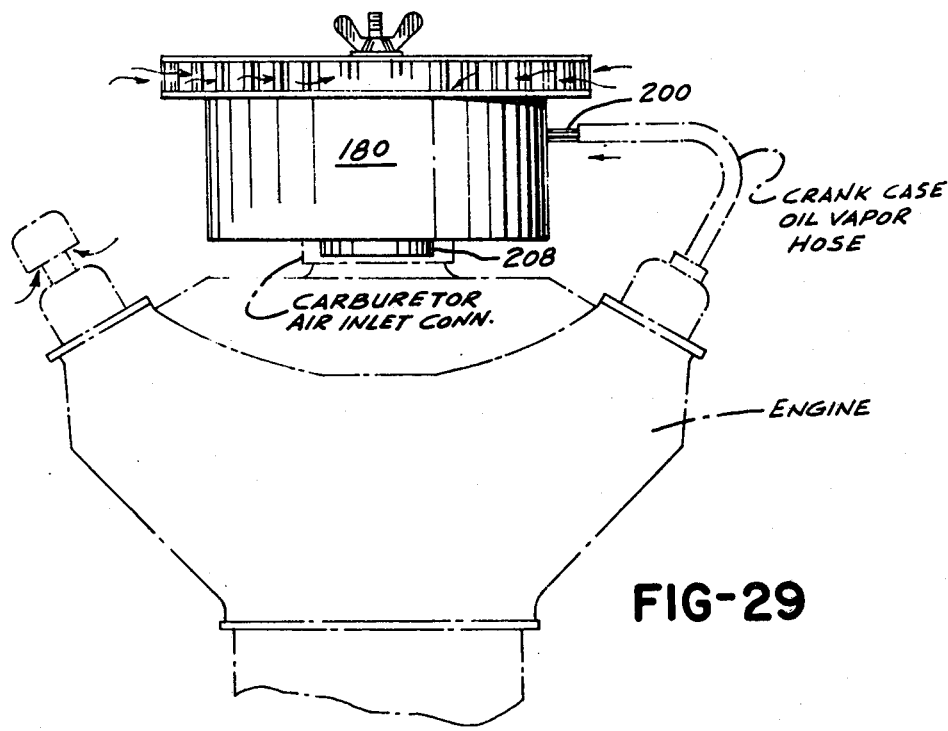
FIG. 29 is a front elevational view of an automobile engine with the carburetor shown in FIG. 11 mounted thereon.

FIG. 29 is one embodiment of the invention shown mounted on a gasoline engine.

Air purifier 180 consists of a lap joint adapter 208 connected to any known make carburetor air inlet connection, an oil vapor exhaust hose leading from the crankcase to the oil vapor hose inlet connection 200 of the embodiment.

FIG. 30

Figure 30:
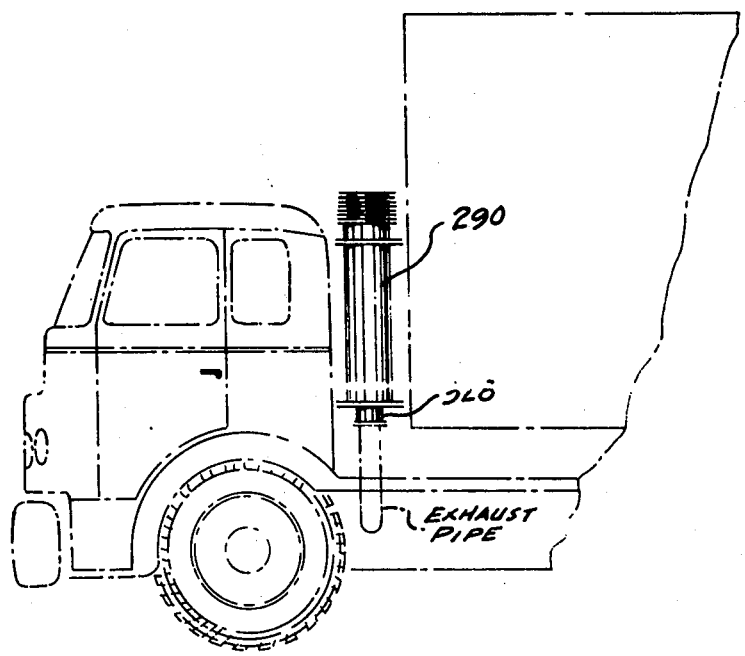
FIG. 30 is a side elevational view of a portion of a truck with the air purifier shown in FIG. 17 vertically mounted on the diesel engine exhaust pipe.

FIG. 30 is the upright air purifier 290 of FIGS. 17–20 shown mounted from bottom open end 328 of long metal tube 324 of the embodiment to an existing uprise exhaust pipe of a diesel engine truck.

FIG. 31

Figure 31:
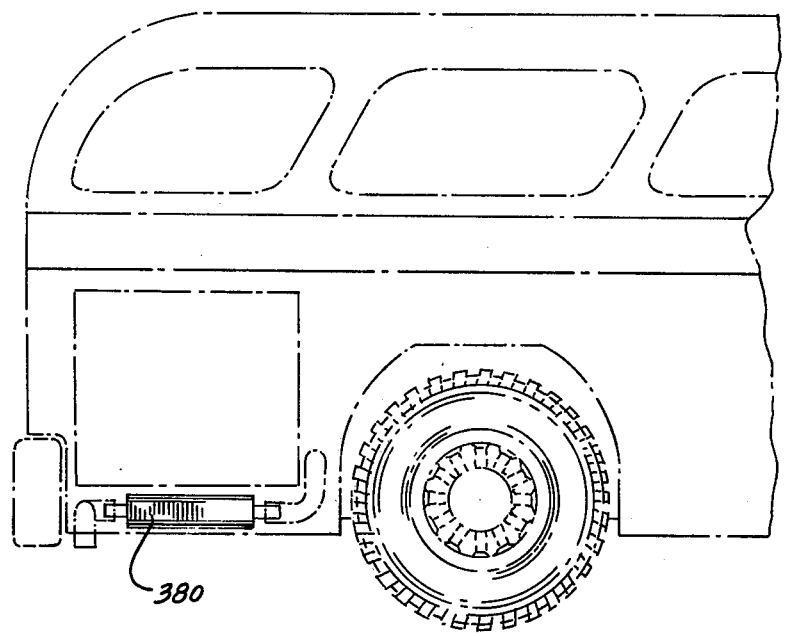
FIG. 31 is a side elevational view of a portion of a bus with the air purifier of FIG. 21 mounted horizontally on the engine exhaust pipe.

FIG. 31 is the combined muffler and air purifier 380 of FIGS. 21–28 shown mounted to an existing engine exhaust pipe and tailpiece in the rear of a bus.

FIG. 32

Figure 32:
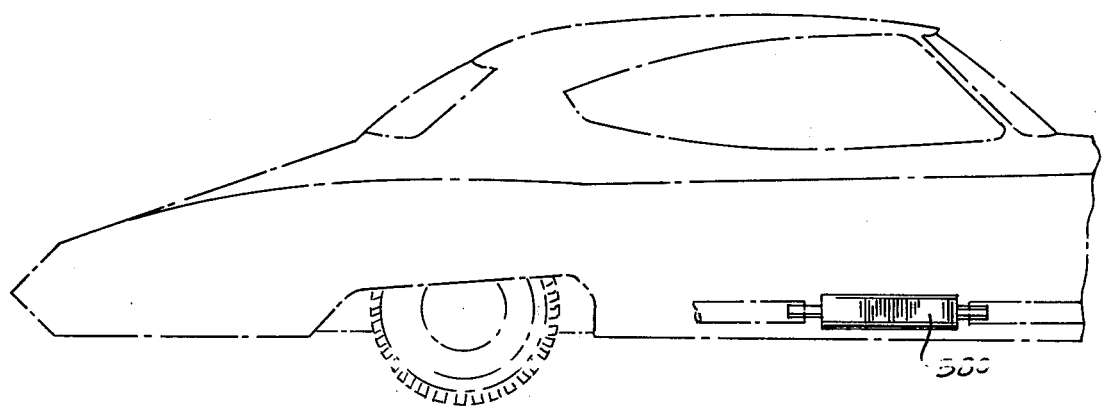
FIG. 32 is a side elevational view of a portion of an automobile with the air purifier shown in FIG. 21 mounted on the exhaust pipe.

FIG. 32 is the same embodiment as described in FIG. 31 except that it is mounted to the existing engine exhaust pipe and tailpiece under an automobile.

FIG. 33

FIG. 33 is a sectional view of serpentine electro-acoustic agglomerator 402 (FIGS. 21–28) which is constructed with two stationary electrodes 402a and 402b and vibrating ribbon 430. This design is used to provide two distinct functions: one is for the removal of mist and solid particles from the exhaust fumes and the other is for silencing the exhaust noise.

Figure 41:
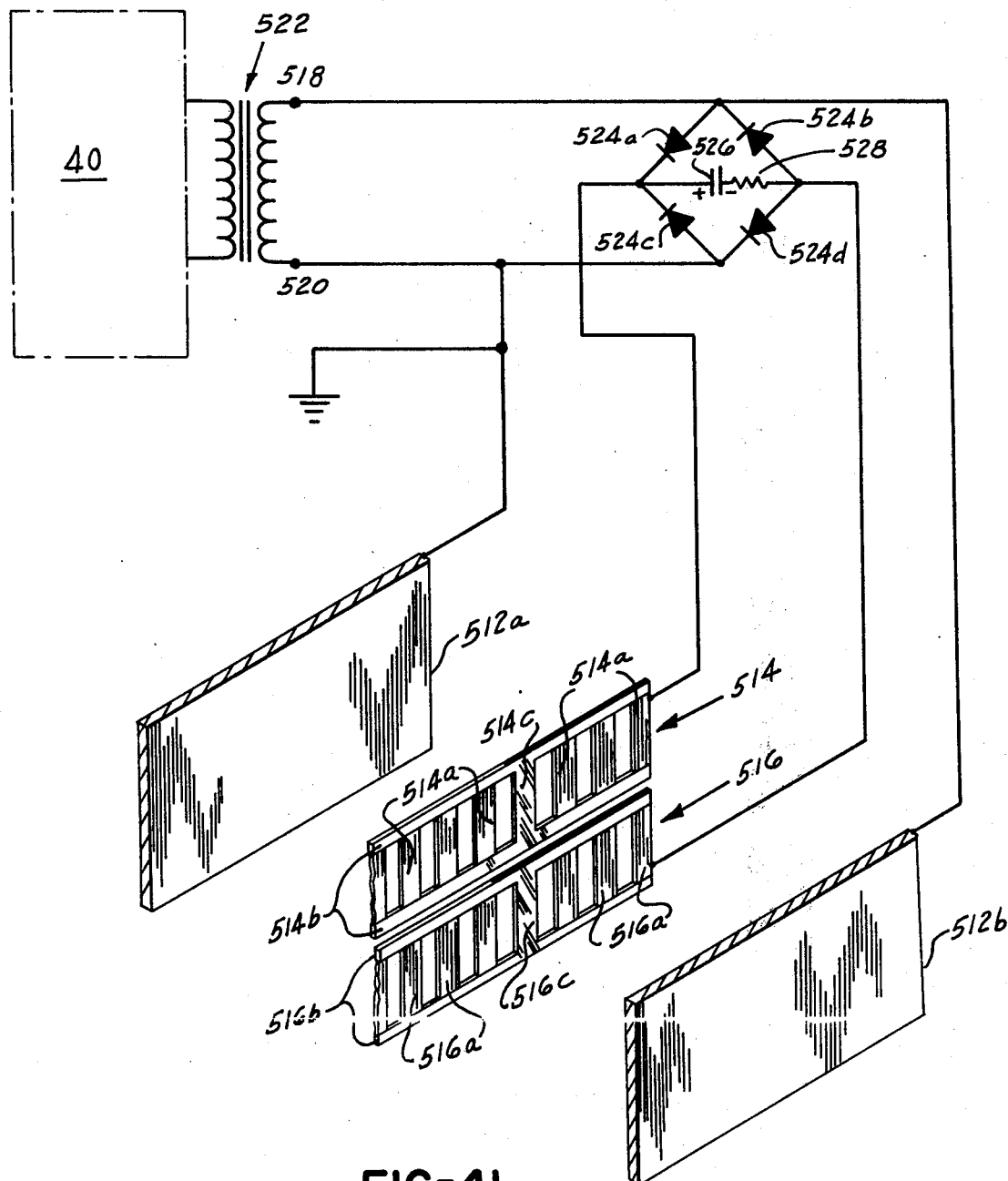
FIG. 41 is a side elevational view, partly schematic and partly perspective, illustrating a portion of the electrode pattern shown in the air purifier of FIG. 37, together with a schematic wiring diagram for such electrodes.

When the hot exhaust gases are forced through the multiple zig-zag path, several beneficial phenomenon occur. One, there is provided a greater heat transfer capability, thus lowering the exhaust temperature which in turn improves agglomeration and lowers the exhaust velocity. Second, it diffuses the sound waves and acts as a sound filter. The combined effect of lowering the exhaust velocity and diffusing the sound waves reduce the noise generating capabilities of the exhaust. Third, the electro-ultrasonic agglomerator removes the solid particles and further reduces the exhaust noise by thoroughly diffusing the sound waves. The electrical circuitry of the electrodes is shown in FIG. 41.

FIG. 34

Figure 38:
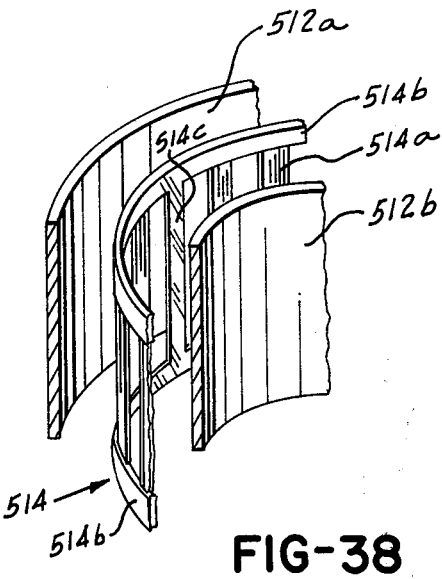
FIG. 38 is a side elevational view, partly in section, of a portion of the electrode arrangement shown in FIG. 37.

FIG. 34 is a side elevational and partly sectional view of FIG. 33 showing detail sections for stationary and vibrauable ribbon electrodes (shown in even greater detail in FIG. 38).

FIG. 35

Figure 35:
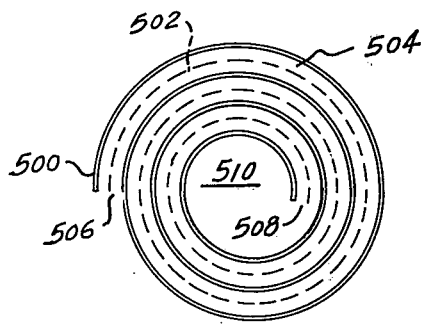
FIG. 35 is a plane view of a portion of the planar helix electrode arrangement shown in the air purifiers of FIGS. 9 and 15.

FIG. 35 is a sectional plane view of a typical electrode planar helix arrangement suitable for use in the apparatus of FIG. 9 and FIG. 15. Planar helix stationary electrode 500 in conjunction with parallel thin electrical helix conductive flexible ribbons 502 form an air flow path 504. Flow path inlet 506 follows the curvature of helix 500 spirally extending toward the center to flow path outlet 508 which exits into air passage 510.

Figure 36:
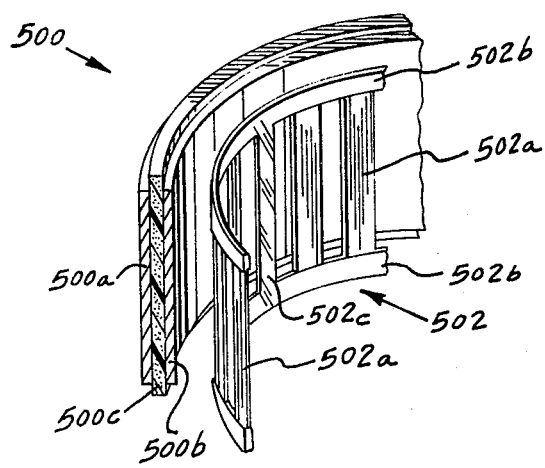
FIG. 36 is an enlarged side elevational view, partly in section, of a portion of the electrode arrangement shown in FIG. 35.

Planar helix stationary electrode 500 (as can be seen in FIG. 36) consists of two electrically conductive films which form the stationary electrode plates 500a and 500b and are separated by a layer of electrical insulator 500c.

The flexible conductive ribbon electrode 502 comprises a series of flexible vertical ribbon components 502a of various shape of configurations, thicknesses and/or weights capable of vibration in which the individual ribbon components create their own resonance frequency, when vibrated and such frequencies preferably differ from one another.

The flexible conductive ribbons 502a are activated by suitable electrical impules. The vibrating ribbons 502a generate sound (sonic) waves and also impart electrical charges to particles. By carefully designing these ribbons and the electrical power source, a multiple of ultrasonic frequencies can be generated simultaneously. These ultrasonic energies readily agglomerate charged particles of a large range of particle sizes.

In order to keep the ribbon components 502a sequentially in place, a set of electrically conductive horizontal helical bands 502b (through which electrical current can be carried to the ends of the ribbons 502a), is attached to the top and bottom ends of ribbons 502a which are preferably proportionally placed according to their thickness or weight. Rigid supporting ribbons 502c are connected to helical bands 502b in parallel with vibrating ribbons 502a at various appropriate intervals to maintain the parallel spacing of helical bands 502b.

Figure 42:
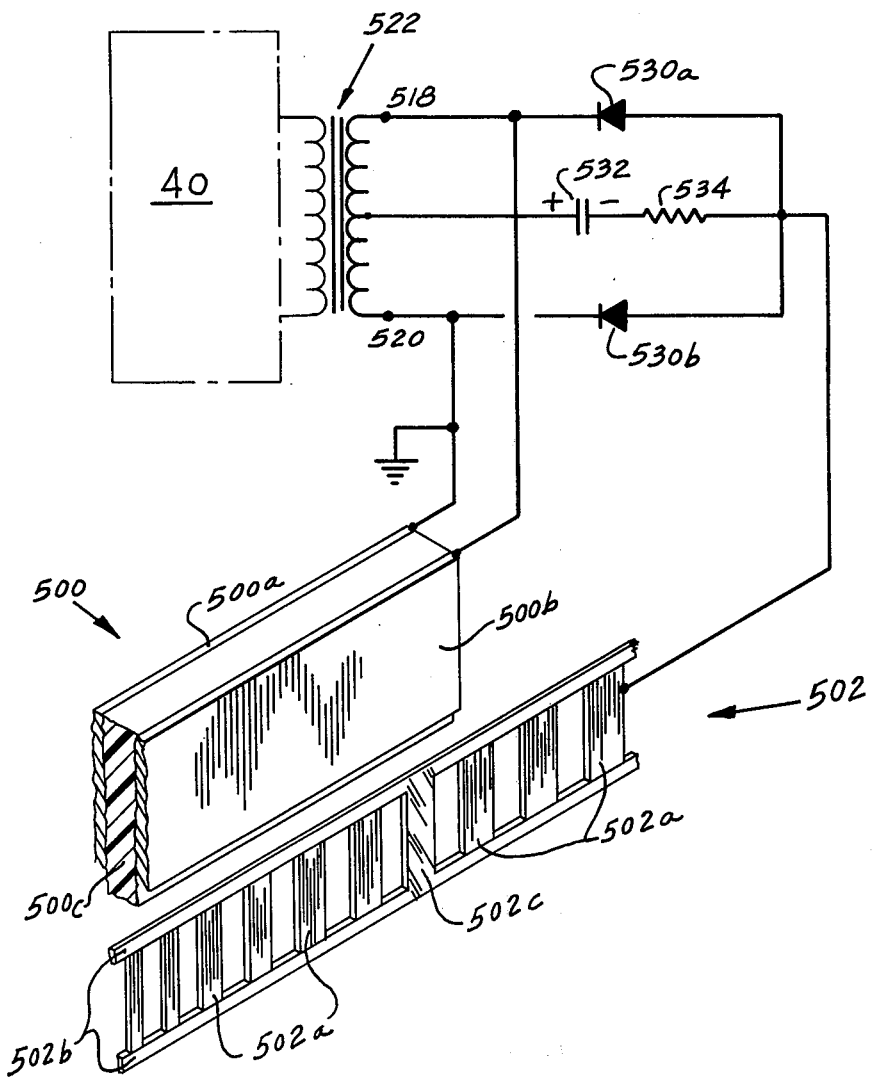
FIG. 42 is a side elevational view, partly schematic and partly perspective, illustrating a portion of the electrode pattern shown in the air purifier of FIG. 35, together with a schematic wiring diagram for such electrodes.

The electrical circuitry associated with the electrodes is shown in FIG. 42.

The electrical conductive flexible vibratable ribbons 502a are made of a different thickness so that each has a different self-resonance frequency, since the resonance frequency of a ribbon when both ends are clamped is proportional to the thickness.

FIG. 37

Figure 37:
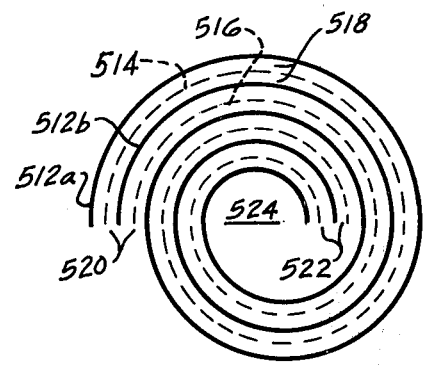
FIG. 37 is a plane view of the bifilar planar helix electrode arrangement of the invention shown in the air purifiers of FIGS. 6, 11 and 17.

FIG. 37 is a sectional plane view of a bifilar planar helix which is used as a typical electrode arrangement for FIGS. 6, 11 and 17. The bifilar (two spirals) planar helix 512 consists of an outer stationary electrode plate 512a and an inner stationary electrode plate 512b, an outer row of flexible (capable of vibration) ribbons comprising assembly 514 and inner row of a flexible (capable of vibration) ribbons comprising assembly 516 both of which form a dual air flow path 518 with flow path inlet 520 and flow path outlet 522, and air passage 542.

FIG. 38

FIG. 38 is a detailed sectional view of FIG. 37. The two helices 512a and 512b are made up of electrical conductive material of sufficient thickness to form a rigid self supporting structure. The two flexible ribbon assemblies 514 and 516 are made up of three elements: flexible ribbons 514a, supporting helical bands 514b, and supporting ribbons 514c. The ribbon assembly design used in FIG. 38 is the same as that used in FIG. 36. Electrical connections are shown in FIG. 41. The advantages of this design over the one shown in FIGS. 35 and 36 are that it provides greater volume of gas handling capability, and eliminates the necessity for a sandwiched electrode design (i.e. 500). The circuit shown in FIG. 42 may also be used with this design.

FIG. 39

Figure 39:
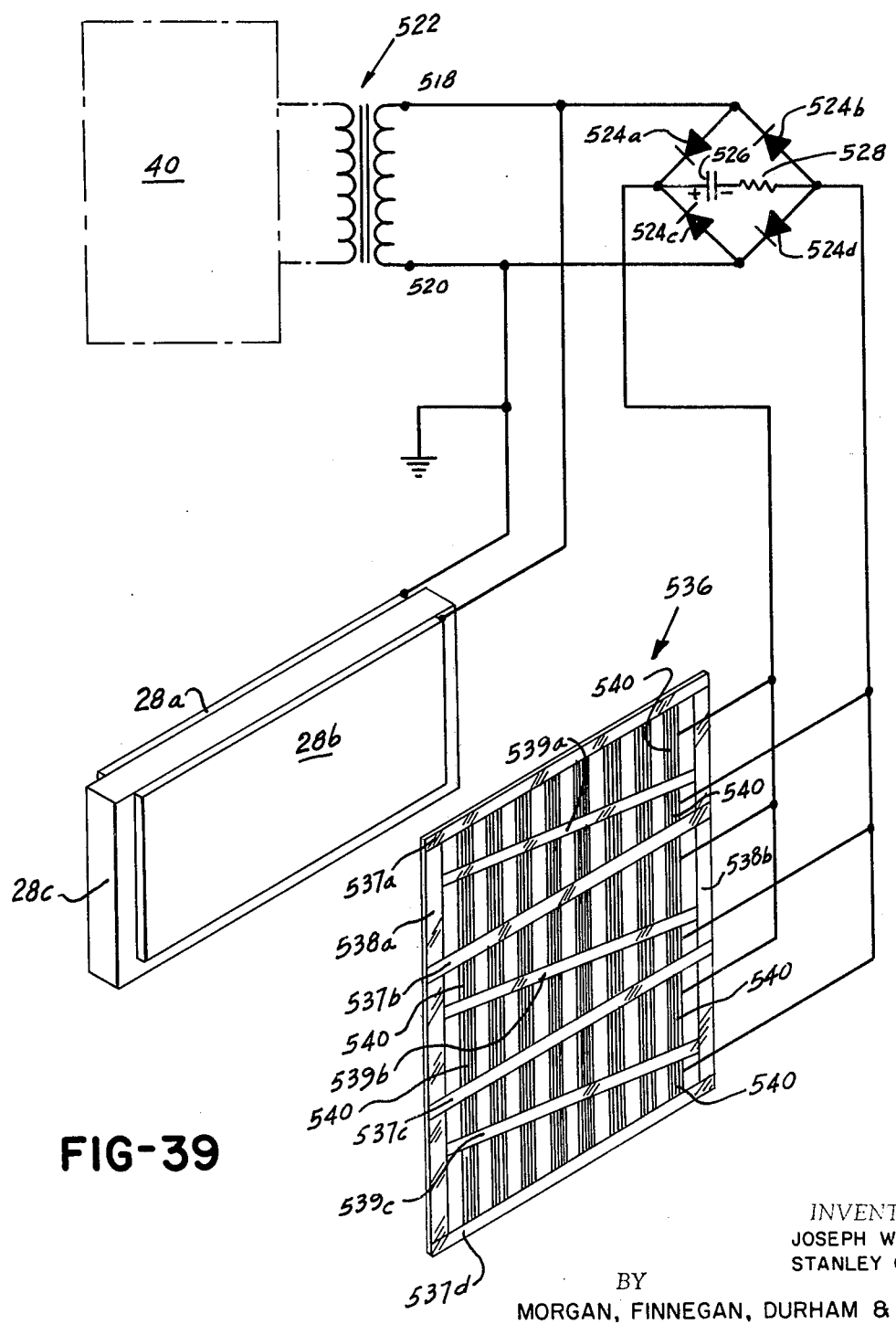
FIG. 39 is a side elevational view, partly schematic and partly perspective, of a portion of the electrode arrangement shown in FIG. 1 together with a schematic wiring diagram for such electrodes.

FIG. 39 shows a schematic of an electronic circuit connected to a detailed view of the stationary electrode of FIG. 3 and the details of a flexible vibratable ribbon assembly 536 consisting of four discrete elements: horizontal binding strips 537a, 537b, 537c and 537d; supporting strips 538a and 538b; electrically insulating strips 537a, b and c and flexible vibratable vertical ribbons 540.

The horizontal binding strips, vertical supporting ribbons and inclined strips are used to hold vibrating ribbons 540 in place to form a rigid assembly. The horizontal binding strips 537 are electrically conductive and are used to carry electrical current to the vibrating ribbons 540 which are made of electrically conductive materials.

Each vibrating ribbon has a different self-resonant frequency that its adjacent ribbon, which is achieved by making each ribbon of different length. The inclined strips provide the necessary suppport for the ribbons of different length and at the same time provide necessary electrical isolation between the top and the bottom groups of ribbon.

The electrode connections are shown for a single-end transformer output with bridge circuit rectification arrangement. The two transformer output terminals 518 and 520 are connected to the two stationary electrodes 28a and 28b; for safety purposes the outer electrode 28a is electrically grounded.

Also connected to the transformer output terminals are the four diodes 524, which form a full wave bridge rectifying circuit, that charges up the storage capacitor 526, through a limiting resistor 528. The outputs of the bridge circuit are connected to vibrating ribbon assembly 540.

FIG. 40

Figure 40:
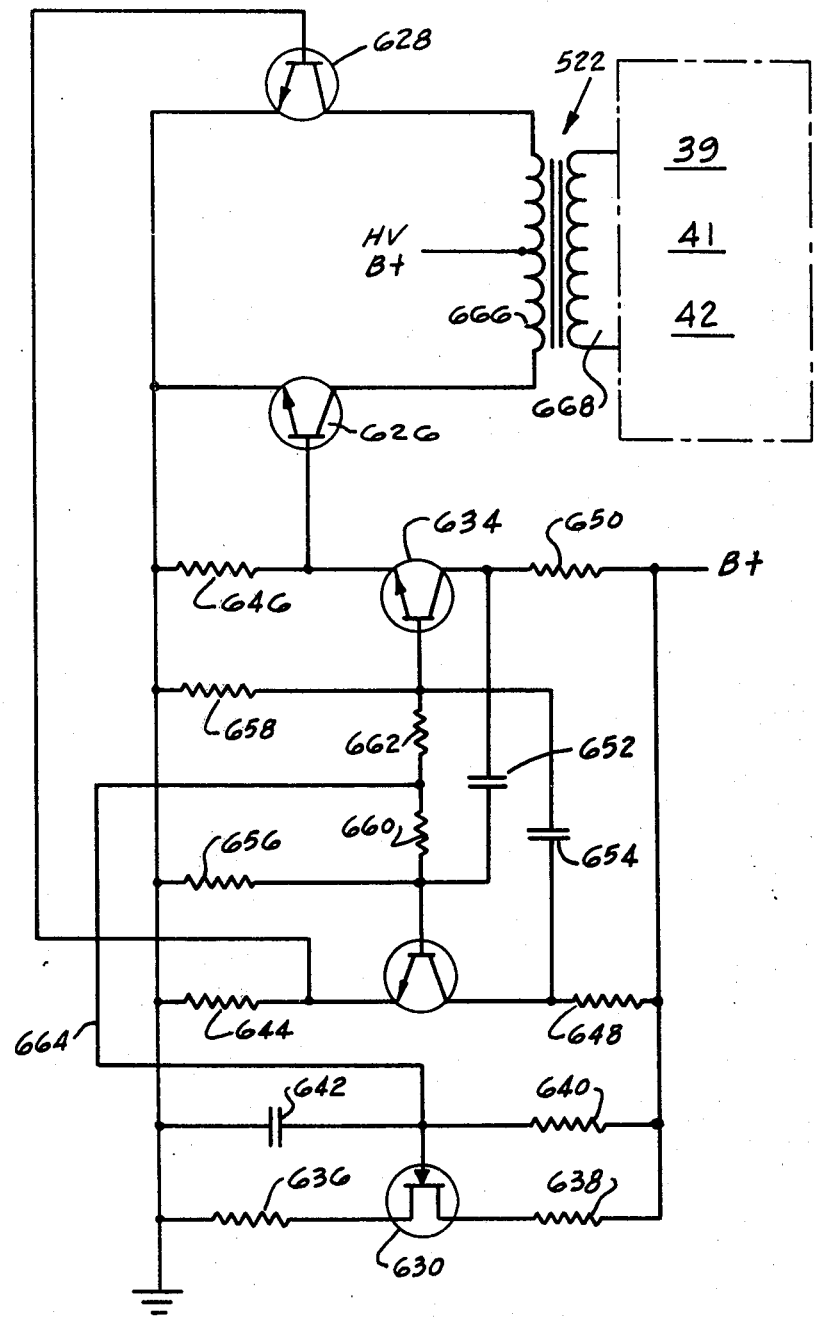
FIG. 40 is a schematic diagram of a typical high voltage frequency modulated power supply which can be used in conjunction with a schematic wiring diagram shown in FIG. 39, 41, 42 and 43.

FIG. 40 is an electrical schematic diagram of a typical high voltage frequency modulated ultrasonic power supply which is shown as box 40 in FIGS. 39, 41 and 42. The electrodes are energized through transformer 522, which in turn is powered through push-pull transistors 626 and 628 which in turn are power driven by a voltage control oscillator circuit.

The frequency modulated power supply includes a unijunction transistor 630 which is part of a frequency modulation control for saw tooth pulse generating stage, a pair of NPN transistors 632 and 634 which operate as a voltage controlled free running multi vibrating stage, and the transistors 626 and 628 which operate as a power output stage. The bases of the unijunction transistor 630 are connected to ground and the positive source of supply through resistors 636 and 638, respectively. The RC circuit is formed by a resistor 640 and a capacitor 642 connected in series between the positive source and ground. The emitter of the unijunction transistor 630 is connected to the junction between the resistor 640 and the capacitor 642.

When the potential is applied to the pulse generating circuit a potential gradually builds up across capacitor 642 and when this potential reaches the breakdown potential of the unijunction transistor the capacitor discharges through one of the emitter base circuits of the transistor. As a result, a saw tooth signal is developed across the capacitor.

The emitter of the transistors 632 and 634 in the multi vibrator circuit are connected to ground via resistors 644 and 646, respectively, whereas the collectors are connected to the positive source through resistors 648 and 650. Capacitors 652 and 654 provide the cross coupling networks: capacitor 652 being connected between the collector and transistor 634 and the base transistor 632, and capacitor 654 being connected between the collector of transistor 632 and the base of transistor 634. The bases of transistors 632 and 634 are connected to ground respectively through resistors 656 and 658 and are also connected to one another through series resistors 660 and 662. The conductor 664 couples the junction of resistor 640 and capacitor 642 to the junction of the resistors 660 and 662.

The free running multi vibrator circuit including transistors 632 and 634 operates with the transistors alternately becoming conductive. The frequency of the oscillator is controlled by the RC coupling network 652, 654, 656 and 658 in conjunction with the controlling voltage from the saw tooth pulse generator that is being supplied via conductor 664.

The collectors of amplifying transistors 626 and 628 are connected to opposite ends of a primary winding 666 of transformer 522, and the emitters of these transistors are connected to ground. The base of transistor 626 is coupled to the emitter of transistor 634 and the base of transistor 628 is connected to the emitter of transistor 632. A high voltage positive source is connected to the center tap of primary winding 666.

Transistors 626 and 628 are periodically, and alternately, driven into the conductive states as determined by the associated driving transistors 632 and 634 in the multi vibrator circuit. As a result, a square wave, alternating signal is developed across the primary winding having a fundamental frequency as determined by the controlling voltage from the unijunction transistor 630, and the free running frequency of the multi vibrator.

Transformer 522 is a high voltage step-up transformer that is capable of developing peak-to-peak voltage as high as 100,000 volts depending on application across the transformer secondary winding 668.

FIG. 41

FIG. 41 is a schematic of the electrode connections for a single-end transformer output which a bridge circuit rectification arrangement. This is an embodiment of the electrical connection for the bifilar arrangement in FIG. 37. The two transformer output terminal 518 and 520 are connected to the two stationary electrodes 512a and 512b. For safety purpose the outer electrode 512a is electrically grounded. Also connected to the transformer output terminal are the four diodes 524 which form the full wave bridge rectifying circuit that charges up the storage capacitor 526 through a limiting resistor 528. The outputs of the bridge circuit are connected to the flexible vibratable ribbon assemblies 514 and 516. This circuit provides a dual set of pulsating high voltage outputs to the electrodes.

FIG. 42

FIG. 42 is a detailed schematic of the electrode connections (electrodes from FIG. 36) for a center tap full wave rectification arrangement. The two outer terminals 518 and 520 of transformer 522 outputs are connected to stationary electrodes 500a and 500b, and to the diodes 530a and 530b. The lower terminal 520 is connected to the outer stationary electrode 500a which is grounded for safety purpose. The cathodes of the two diodes are connected together to charge the storage capacitor 532 through the current limiting resistor 534. The output of the diodes is connected to the vibratable ribbon assembly 502. For compact designs such as the one shown in FIGS. 35 and 36 the two stationary electrodes are separated with an electrical insulation sheet 500a. The ribbon assembly 502 is connected to the storage capacitor 532 through the limiting resistor 534. The outer electrode 500a of FIG. 35 is connected to the grounded side 512 of the transformer 514 shown in FIG. 40.

The inner electrode 500c is connected to the high side 518 of the transformer 522. The center tap of the transformer 510 is connected to the plus side of the storage capacitor 532. Two diode rectifiers 530a and 530b are connected back to back across the transformer. Their cathodes are connected to the negative side of the storage capacitor through the current limiting resistor 534.

During steady state operation the capacitor 532 is charged to one half of the voltage across the output terminals 518 annd 520. At the instant when the transformer output goes through zero voltage, the potential between the outer stationary electrode 500a and the ribbon assembly 502 is the same as the inner electrode 500b and ribbon assembly 502, and is equal to the voltage across capacitor 532.

When this occurs, the attractive forces between stationary electrodes 500a and 500b and ribbon assembly 502 are balanced and ribbons 502a remain stationary.

As the high end 518 of the transformer becomes more positive with respect to the low end 520, the balance is upset and the ribbons 502a will be attracted to the inner electrode 500c.

After the cycle reaches its maximum and reverses, the outer electrodes 500a during the next half of the cycle processes more attraction force and ribbons 502a will move even more toward outer electrode 500a. This oscillating electrical force causes ribbons 502a to vibrate. When the oscillating force frequency equals the self-resonance frequency of the ribbons 502, violent vibration of the ribbon results and high sound wave of intensity is generated. Since the maximum distance between any point inside a flow path of any of the gas processing apparatus in this disclosure and the vibrating ribbons is less than one wave length of the lowest operating frequency, all solid matters flowing through the apparatus will experience an extremely strong acoustic field. This strong acoustic field in conjunction with the electrostatic field will agglomerate practically all solid matters and they will be removed from the gas.

FIG. 43

Figure 43:
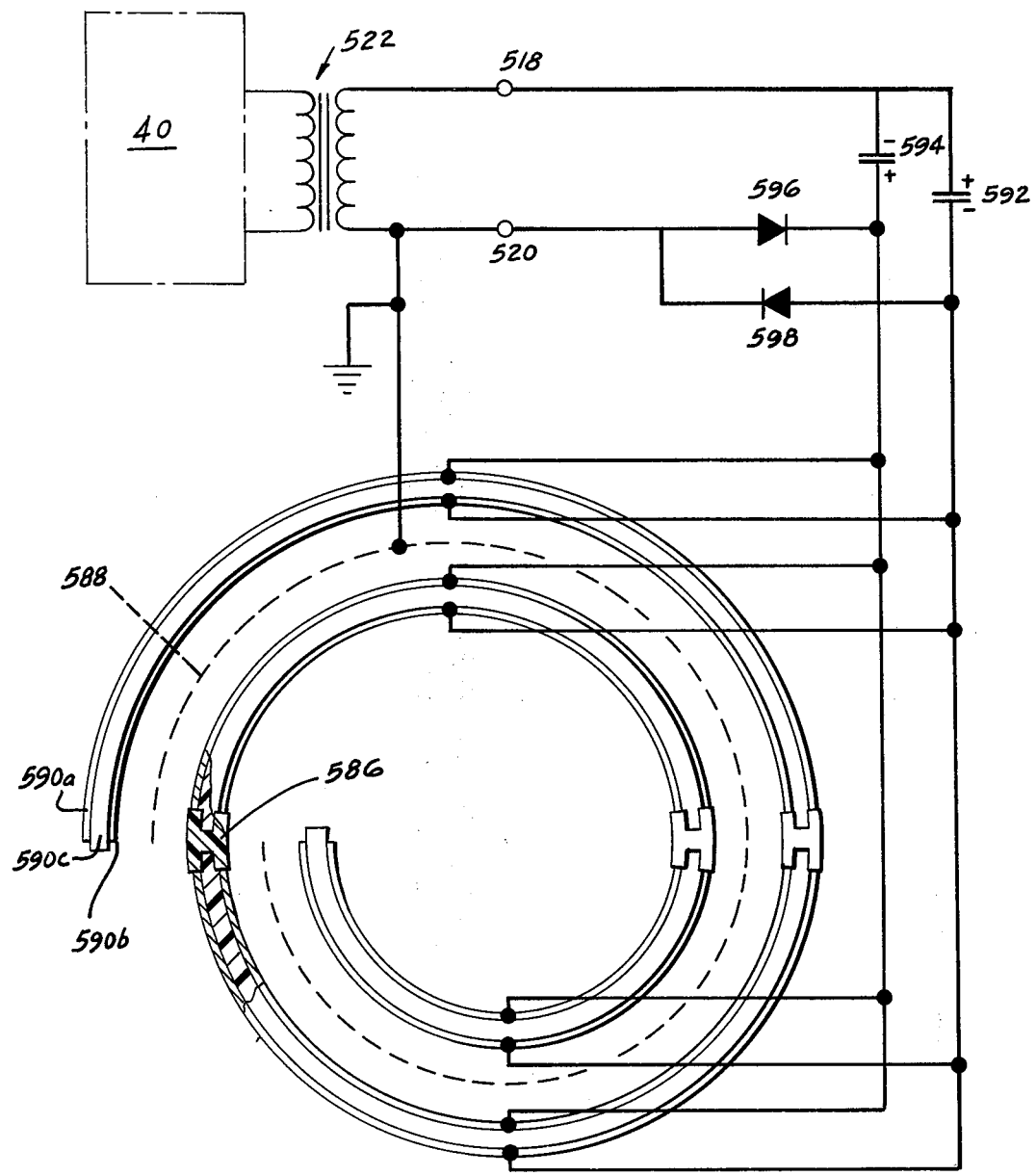
FIG. 43 is a plane view of another embodiment of an electrode helix arrangement for the air purifiers shown in FIGS. 9 and 15, together with a schematic wiring diagram for such electrodes.

FIG. 43 shows another electrical arrangement and electrode connections. This electrical arrangement provides twice as much electric-static force for a given output voltage between terminals 518 and 520 of the output transformer 522. The stationary electrodes 590a and 590b instead of being a continuous helix are divided into several 180° sectors. These sectors are insulated electrically with spacers 586. The outer electrode 590a and the inner electrode 590b of the first sector are connected to a positive and a negative potential, respectively. This electrode electrical connection arrangement is reversed in the second sector. The reversal occurs every 180° to therefore reverse the electric field vector every 180° providing thereby an alternating field vector along the flow path. Both the increase in electro-static force and the alternative electric-static field vector make this figuration most effective. The diodes 596 and 598 and the capacitors 594 and 592 perform the same function as in previous descriptions.

The gas processing apparatus and method of the invention has been particularly described with respect to purifying contaminated air. This invention also possesses characteristics which make it remarkably well suited for carrying out chemical reactions in a variety of ways. For instance, finely divided catalyst can be introduced into the apparatus with two or more gaseous components. Under the influence of the catalyst and the sonic and electro-static forces within the apparatus, reactions can be carried out to yield either fluid or solid reaction products. Instead of catalyst, moreover, the particulate material introduced can be an adsorbent for the resultant product which can then be easily separated by the normal operation of the apparatus. Also, rather than introducing particulate catalytic adsorbent material with the gaseous stream such adsorbents or catalyst can be used to line the conduit surface of the apparatus. Thus, although the invention has been described with a certain degree of particularity, it is clear that departure therefrom can be made within the scope of the accompanying claims without departing from the principles of the invention and without sacrificing its major advantages.

What is claimed is:

1. Gas processing or treating apparatus to effect chemical or physical changes in said gases or air, said unit comprising housing means, inlet means in said housing for admitting untreated gases or air thereinto for processing therein, adjacent and parallel electrodes positioned in said housing in the path of the incoming untreated gases or air, one of said electrodes being stationary and the other of said electrodes having flexible electrode means, said flexible electrodes means having a conductive upper longitudinal extending member, a conductive lower longitudinal extending member in substantially parallel relationship to said upper longitudinal member, and a plurality of spaced transversed flexible conductive ribbon members which are electrically vibratable for generating high intensity sonic forces and which have the upper portions thereof connected to said upper member and the lower portions thereof connected to said low longitudinal member, electrical circit means operatively connected to said electrodes which generate high intensity pulsating electrical and sonic forces between said stationary electrode and vibrating electrode means for treating the gases or air as the same flows through said housing means, and outlet means in said housing means through which the processed gases or air are carried from said housing means.

2. Gas processing or air purifying apparatus according to claim 1 wherein said housing is cylindrical and wherein said outlet means is a concentric cylinder within said housing and wherein said vibrating electrodes and said stationary electrodes are supported and connected to said housing at an acute angle.

3. Gas processing or air purifying apparatus of claim 1 with inlet means for receiving oil fumes and is attached in operable relation to an internal combustion engine carburetor.

4. Gas processing or air purifying apparatus of claim 1 which also contains fog producing means.

5. Gas processing or air purifying apparatus according to claim 1 wherein said flexible electrode and said stationary electrode has a folded-snake like configuration with a plurality of U-shaped folds wherever said electrodes define a change in direction of the conduit.

6. Gas processing or air purifying apparatus of claim 5 in combination with an exhaust conduit of an internal combustion engine.

7. Gas processing or treating apparatus to effect chemical or physical changes in said gases or air, said unit comprising housing means, inlet means in said housing for admitting untreated gases or air thereinto for processing therein, spiral electrodes positioned in said housing in the path of the incoming untreated gases or air, one of said electrodes being stationary and the other of said electrodes having flexible electrode means, said flexible electrode means having a conductive upper longitudinal extending member, a conductive lower longitudinal extending member in substantially parallel relationship to said upper longitudinal member, and a plurality of spaced transversed flexible conductive ribbon members which are electrically vibratable for generating high intensity sonic forces and which have the upper portions thereof connected to said upper member and the lower portions thereof connected to said lower longitudinal member, a pulsating alternate electrical voltage source connected to said electrodes for generating high intensity pulsating electrical and sonic forces between said spiral stationary electrode and vibrating electrode means for treating the gases or air as the same flows between said electrodes and through said housing means, and outlet means in said housing means through which the processed gases or air are carried from said housing means.

8. Gas processing or air purifying apparatus according to claim 7 wherein propulsion means are provided to force gas into said inlet means and out of said outlet means.

9. Gas processing or air purifying apparatus according to claim 7 wherein said housing is cylindrical and said vibrating electrode and said stationary electrode of said gaseous processing conduit apparatus form a spiral configuration commencing at the center of said housing.

10. Gas processing or air purifying apparatus according to claim 7 wherein said housing is cylindrical and said outlet means is a concentric cylinder at the center of said housing, and said concentric cylinder is also said stationary electrode and said flexible electrode assumes a helical configuration from top to bottom of said concentric cylindrical stationary electrode.

* * * * *